US008386964B2

(12) United States Patent
Sun et al.

(10) Patent No.: US 8,386,964 B2
(45) Date of Patent: Feb. 26, 2013

(54) INTERACTIVE IMAGE MATTING

(75) Inventors: Jian Sun, Beijing (CN); Kaiming He, Beijing (CN); Jiangyu Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 12/841,094

(22) Filed: Jul. 21, 2010

(65) Prior Publication Data

US 2012/0023456 A1    Jan. 26, 2012

(51) Int. Cl.
*G06F 3/033* (2006.01)
*G06F 3/048* (2006.01)

(52) U.S. Cl. ........................................ 715/863; 715/856
(58) Field of Classification Search .................. 715/863, 715/856
See application file for complete search history.

(56) References Cited

U.S. PATENT DOCUMENTS

| | | | | |
|---|---|---|---|---|
| 5,767,860 A * | 6/1998 | Zimmer et al. | ............... | 345/441 |
| 6,078,331 A * | 6/2000 | Pulli et al. | ...................... | 345/423 |
| 6,130,676 A | 10/2000 | Wise et al. | | |
| 6,134,345 A | 10/2000 | Berman et al. | | |
| 6,226,000 B1 | 5/2001 | Richens et al. | | |
| 6,791,573 B2 * | 9/2004 | Hamburg | ........................ | 345/619 |
| 6,919,893 B2 * | 7/2005 | Tobita et al. | ................... | 345/473 |
| 7,236,180 B2 * | 6/2007 | Dresevic et al. | ............. | 345/592 |
| 7,280,117 B2 * | 10/2007 | Fayan | ............................ | 345/592 |
| 7,400,763 B2 * | 7/2008 | Hamburg | ........................ | 382/163 |
| 7,430,339 B2 | 9/2008 | Rother et al. | | |
| 7,602,405 B2 * | 10/2009 | Hsu | ................................ | 345/629 |
| 7,627,168 B2 * | 12/2009 | Hamburg | ....................... | 382/163 |
| 7,636,128 B2 * | 12/2009 | Sun et al. | ....................... | 348/586 |
| 7,692,664 B2 * | 4/2010 | Weiss et al. | ....................... | 345/592 |
| 2003/0161014 A1 * | 8/2003 | Tobita et al. | ................... | 358/537 |
| 2006/0029275 A1 | 2/2006 | Li et al. | | |
| 2006/0221248 A1 | 10/2006 | McGuire et al. | | |
| 2007/0013813 A1 | 1/2007 | Sun et al. | | |
| 2007/0070226 A1 | 3/2007 | Matusik et al. | | |
| 2007/0165966 A1 | 7/2007 | Weiss et al. | | |
| 2007/0263119 A1 | 11/2007 | Shum et al. | | |
| 2008/0317388 A1 * | 12/2008 | Hamburg | ....................... | 382/311 |
| 2009/0097728 A1 | 4/2009 | Lee et al. | | |
| 2009/0278859 A1 | 11/2009 | Weiss et al. | | |
| 2011/0038536 A1 * | 2/2011 | Gong | ............................ | 382/164 |
| 2011/0216976 A1 * | 9/2011 | Rother et al. | .................. | 382/173 |
| 2011/0293247 A1 * | 12/2011 | Bhagavathy et al. | ......... | 386/278 |
| 2012/0020554 A1 * | 1/2012 | Sun et al. | ....................... | 382/164 |

OTHER PUBLICATIONS

Bai, et al., "A Geodesic Framework for Fast Interactive Image and Video Segmentation and Matting", retrieved on Apr. 20, 2010 at <<http://webdocs.cs.ualberta.ca/~jag/papersVis2/07ICCV/data/papers/ICCV/094.pdf>>, IEEE International Conference on Computer Vision (ICCV), Rio De Janeiro, BR, 2007, pp. 1-8.

(Continued)

*Primary Examiner* — David Phantana Angkool
(74) *Attorney, Agent, or Firm* — Lee & Hayes, PLLC

(57) ABSTRACT

A user interface enables interactive image matting to be performed on an image The user interface may provide results including an alpha matte as feedback in real time. The user interface may provide interactive tools for selecting a portion of the image, and an unknown region for alpha matte processing may be automatically generated adjacent to the selected region. The user may interactively refine the alpha matte as desired to obtain a satisfactory result.

20 Claims, 21 Drawing Sheets

OTHER PUBLICATIONS

Borodajkewycz, "Tomorrow's Photoshop Effects", retrieved on Apr. 20, 2010 at <<http://forum.artoolkit.org/courses/Seminar/WS2009/Tomorrows_PhotoShop_Effects.pdf>>, Technische Universitat, Wien, Austria, Report at Seminar on Computer Graphics, 2009, pp. 1-18.

Bousseau, et al., "User-Assisted Intrinsic Images", retrieved on Apr. 21, 2010 at <<http://artis.imag.fr/Publications/2009/BPD09/intrinsic_main.pdf>>, ACM, Transactions on Graphics (TOG), vol. 28, No. 5, Dec. 2009, pp. 1-10.

Chang, et al., "An Iterative Bayesian Approach for Digital Matting", retrieved on Apr. 21, 2010 at <<http://ieeexplore.ieee.org/stamp/stamp.jsp?tp=&arnumber=1699162>>, IEEE Computer Society, 18th International Conference on Pattern Recognition (ICPR), Hong Kong, vol. 2, 2006, pp. 122-125.

Chuang, et al., "A Bayesian Approach to Digital Matting", retrieved on Apr. 20, 2010 at <<http://citeseerx.ist.psu.edu/viewdoc/download?doi=10.1.1.8.2400&rep=rep1&type=pdf>>, IEEE Proceedings of Computer Vision and Pattern Recognition (CVPR), vol. II, Dec. 2001, pp. 264-271.

Chuang, et al., "Video Matting of Complex Scenes", ACM, Proceedings of the 29th Annual Conference on Computer Graphics and Interactive Techniques, SESSION: Images and Video, 2002, pp. 243-248.

Crow, "Summed-Area Tables for Texture Mapping", retrieved on Apr. 20, 2010 at <<http://citeseerx.ist.psu.edu/viewdoc/download?doi=10.1.1.124.1904&rep=rep1&type=pdf>>, ACM, Computer Graphics, vol. 18, No. 3, Jul. 1984, pp. 207-212.

Elder, et al., "Image Editing in the Contour Domain", IEEE Transactions on Pattern Analysis and Machine Intelligence, vol. 23, Issue 3, Mar. 2001, pp. 291-296.

Farbman, et al., "Edge-Preserving Decompositions for Multi-Scale Tone and Detail Manipulation", retrieved don Apr. 21, 2010 at <<http://www.cs.huji.ac.il/~danix/epd/epd-small.pdf>>, ACM, International Conference on Computer Graphics and Interactive Techniques (CCGIT), Los Angeles, CA, vol. 27, No. 3, 2008, pp. 67-77.

Fattal, et al., "Edge-Based Image Coarsening", retrieved on Apr. 21, 2010 at <<http://vis.berkeley.edu/papers/ebic/ebic_manuscript.pdf>>, ACM, Transactions on Graphics (TOG), vol. 29, No. 1, Dec. 2009, pp. 1-20.

Fattal, et al., "Gradient Domain High Dynamic Range Compression", ACM, Proceedings of the 29th Annual Conference on Computer Graphics and Interactive Techniques SESSION: Images and Video, 2002, pp. 249-256.

Finlayson, et al., "Removing Shadows From Images", Computer Vision—ECCV 2002: 7th European Conference on Computer Vision, May 28-31, 2002, pp. 129-132.

Zheng, et al., "Learning Based Digital Matting", retrieved on Apr. 20, 2010 at <<http://zheng.vision.googlepages.com/matting_iccv09_Zheng.pdf>>, IEEE 20th International Conference on Computer Vision (ICCV), Kyoto, Japan, 2009, pp. 1-8.

Grady, et al., "Random Walks for Interactive Alpha-Matting", retrieved on Apr. 20, 2010 at <<http://citeseerx.ist.psu.edu/viewdoc/download?doi=10.1.1.94.5802&rep=rep1&type=pdf>>, Proceedings of Visualization Imaging and Image Processing (VIIP), Benidorm, Spain, 2005, pp. 423-429.

Guan, et al., "Easy Matting—A Stroke Based Approach for Continuous Image Matting", retrieved on Apr. 21, 2010 at <<http://www.cad.zju.edu.cn/home/chenwei/research/EG2006_paper.pdf>>, The Eurographics Association and Blackwell Publishing, Proceedings of Eurographics, vol. 25, No. 3, 2006, pp. 567-576.

Hasinoff, et al., "Boundary matting for view synthesis", retrieved on Apr. 20, 2010 at <<http://research.microsoft.com/pubs/64217/Hasinoff-CVIU06.pdf>>, Elsevier Science Inc., Computer Vision and Image Understanding, vol. 103, No. 1, 2006, pp. 22-32.

He, et al., "Fast Matting Using Large Kernel Matting Laplacian Matrices", retrieved on Apr. 20, 2010 at <<http://research.microsoft.com/en-us/um/people/jiansun/papers/CVPR10_FastMatting.pdf>>, IEEE Conference on Computer Vision and Pattern Recognition (CVPR). San Francisco, CA, 2010, pp. 1-8.

He, et al., "Single Image Haze Removal Using Dark Channel Prior", retrieved on Apr. 21, 2010 at <<http://research.microsoft.com/en-us/um/people/jiansun/papers/dehaze_cvpr2009.pdf>>, IEEE Conference on Computer Vision and Pattern Recognition (CVPR), Miami, FL, 2009, pp. 1956-1963.

Hillman, et al., "Alpha Channel Estimation in High Resolution Images and Image Sequences" Proceedings of the 2001 IEEE Computer Society Conference on Computer Vision and Pattern Recognition, vol. 1, 2001, pp. I-1063-I-1068.

Hsu, et al., "Light Mixture Estimation for Spatially Varying White Balance", retrieved on Apr. 21, 2010 at <<http://www.shaiavidan.org/papers/lme-sig2008-sm.pdf>>, ACM, International Conference on Computer Graphics and Interactive Techniques, Los Angeles, CA, vol. 27, No. 3, 2008, pp. 1-7.

Levin, et al., "A Closed Form Solution to Natural Image Matting", retrieved on Apr. 20, 2010 at <<http://www.wisdom.weizmann.ac.il/~levina/papers/Matting-Levin-Lischinski-Weiss-CVPR06.pdf>>, IEEE Conference on Computer Vision and Pattern Recognition (CVPR), New York, NY, vol. 1, Jun. 2006, pp. 61-68.

Levin, et al., "Colonization using Optimization", retrieved on Apr. 21, 2010 at <<http://www.wisdom.weizmann.ac.il/~levina/papers/colorization-siggraph04.pdf, ACM, Transactions on Graphics (TOG), vol. 23, No. 3, 2004, pp. 689-694.

Liu, et al., "Paint Selection", retrieved on Apr. 20, 2010 at <<http://research.microsoft.com/en-us/um/people/jiansun/papers/paintselection_siggraph09.pdf>>, ACM Transactions on Graphics (TOG), vol. 28, No. 3, Aug. 2009, pp. 1-7.

Mitsunaga, et al., "AutoKey: Human Assisted Key Extraction", ACM, Proceedings of the 22nd Annual Conference on Computer Graphics and Interactive Techniques, 1995, pp. 265-272.

Narasimhan, et al., "Interactive Deweathering of an Image Using Physical Models", IEEE Workshop on Color and Photometric Methods in Computer Vision, In Conjunction with ICCV, Oct. 2003, 8 pgs.

Perez, et al., "Poisson Image Editing", retrieved on Apr. 21, 2010 at <<http://citeseerx.ist.psu.edu/viewdoc/download?doi=10.1.1.133.6932&rep=rep1&type=pdf>>, ACM, Transactions on Graphics (TOG), vol. 22, No. 3, 2003, pp. 313-318.

Perona, et al., "Scale-Space and Edge Detection Using Anisotropic Diffusion", UC Berkeley EECS Technical Reports, Dec. 20, 1988, Also, IEEE Transactions on Pattern Analysis and Machine Intelligence, vol. 12, Issue 7, Jul. 1990, pp. 629-639, 41 pgs.

Qian, et al., "Video Background Replacement Without a Blue Screen", Proceedings 1999 International Conference on Image Processing, vol. 4, Oct. 24-28, 1999, pp. 143-146.

Rhemann, et al., "A Perceptually Motivated Online Benchmark for Image Matting", retrieved on Apr. 21, 2010 at <<http://www.juew.org/publication/CVPR09_evaluation_final_HQ.pdf>>, IEEE Proceedings on Computer Vision and Pattern Recognition (CVPR), 2009, pp. 1-8.

Rhemann, et al., "Alpha Matting Evaluation Website", retrieved on Apr. 20, 2010 at <<http://www.alphamatting.com>>, IEEE Conference on Computer Vision and Pattern Recognition (CVPR), Jun. 2009, pp. 1-2.

Rhemann, et al., "High Resolution Matting via Interactive Trimap Segmentation", retrieved on Apr. 20, 2010 at <<http://www.ims.tuwien.ac.at/media/documents/publications/RhemannRother-RavAchaSharpTR08.pdf>>, Technical Report TR-188-2-2008-04, IEEE Conference on Computer Vision and Pattern Recognition (CVPR), Alaska, Jun. 2008, pp. 1-12.

Rhemann, et al., "Improving Color Modeling for Alpha Matting", retrieved on Apr. 21, 2010 at <<http://publik.tuwien.ac.at/files/PubDat_169054.pdf, British Machine Vision Conference (BMVC), 2008, pp. 1-10.

Ruzon, et al., "Alpha Estimation in Natural Images", retrieved on Apr. 20, 2010 at <<http://www.cs.duke.edu/~tomasi/papers/ruzon/ruzonCvpr00.pdf>>, IEEE Conference on Computer Vision and Pattern Recognition (CVPR), vol. 1, Jun. 2000, vol. 1, pp. 18-25.

Saad, "Iterative Methods for Sparse Linear Systems", Second Edition, retrieved on Apr. 21, 2010 at <<http://www-users.cs.umn.edu/~saad/PS/iter1.pdf>>, CRC Press, Jan. 3, 2000.

Singaraju, et al., "New Appearance Models for Natural Image Matting", retrieved on Apr. 20, 2010 at <<http://research.microsoft.com/ pubs/80300/cvpr09-matting-newModels.pdf>>, IEEE Conference on Computer Vision and Pattern Recognition (CVPR), Miami, FL, Jun. 2009, pp. 659-666.

Smith, et al., "Blue Screen Matting", ACM, Proceedings of the 23rd Annual Conference on Computer Graphics and Interactive Techniques, 1996, pp. 259-268.

Sun, et al., "Flash Matting", retrieved on Apr. 20, 2010 at <<http://vision.ai.uiuc.edu/~tankh/citations/nonphotorealistic_camera_siggraph2004/sun_siggraph2006.pdf>>, ACM, Transactions on Graphics (TOG), vol. 25, No. 3, Jul. 2006, pp. 772-778.

Sun, et al., "Poisson Matting", retrieved on Apr. 20, 2010 at <<http://citeseerx.ist.psu.edu/viewdoc/download?doi=10.1.1.102.8258&rep=rep1&type=pdf>>, ACM Transactions on Graphics, vol. 23, No. 3, Jul. 2004, pp. 315-321.

Szeliski, "Locally Adapted Hierarchical Basis Preconditioning", retrieved on Apr. 21, 2010 at <<http://research.microsoft.com/pubs/70280/tr-2006-38.pdf>>, ACM, Transactions on Graphics, International Conference on Computer Graphics and Interactive Techniques, vol. 25, No. 3, Aug. 2006, pp. 1135-1143.

Wang, et al., "An Iterative Optimization Approach for Unified Image Segmentation and Matting", retrieved on Apr. 20, 2010 at <<http://research.microsoft.com/en-us/um/people/cohen/iccv2005.pdf>>, IEEE Computer Society, Proceedings of the Tenth International Conference on Computer Vision (ICCV), vol. 2, 2005, pp. 936-943.

Wang, et al, "Image and Video Matting: A Survey", retrieved on Apr. 21, 2010 at <<http://www.nowpublishers.com/getpdf.aspx?doi=0600000019&product=CGV>>, Now Publishers Inc., Foundations and Trends in Computer Graphics and Vision, vol. 3, No. 2, 2007, pp. 97-175.

Wang, et al., "Interactive Video Cutout", retrieved on Apr. 20, 2010 at <<http://juew.org/publication/VideoCutout2005.pdf>>, ACM, International Conference on Computer Graphics and Interactive Techniques, Los Angeles, CA, 2005, pp. 585-594.

Wang, et al., "Optimized Color Sampling for Robust Matting", retrieved on Apr. 20, 2010 at <<http://research.microsoft.com/en-us/um/people/cohen/robustmattingcvprfinal.pdf>>, IEEE Proceedings of Conference on Computer Vision and Pattern Recognition (CVPR), Minneapolis, MN, Jun. 2007, pp. 1-8.

Wang, et al., "Soft Scissors : An Interactive Tool for Realtime High Quality Matting", retrieved on Apr. 20, 2010 at <<http://citeseerx.ist.psu.edu/viewdoc/download?doi=10.1.1.64.3777&rep=rep1&type=pdf>>, ACM, International Conference on Computer Graphics and Interactive Techniques, San Diego, CA, vol. 25, No. 3, 2007, pp. 1-6.

* cited by examiner

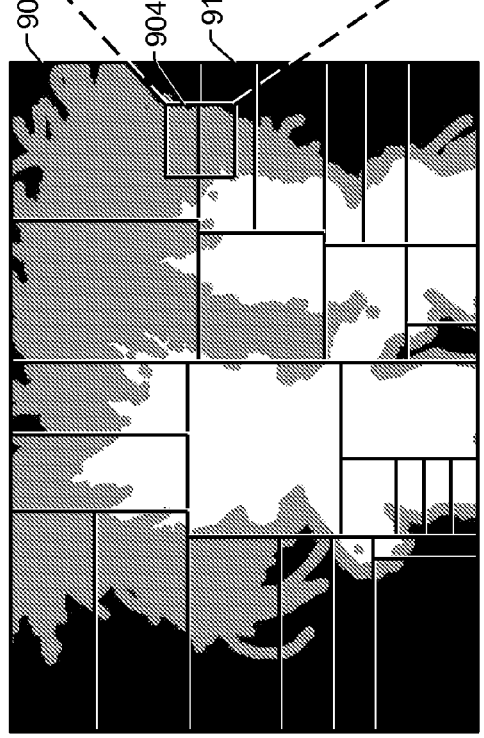
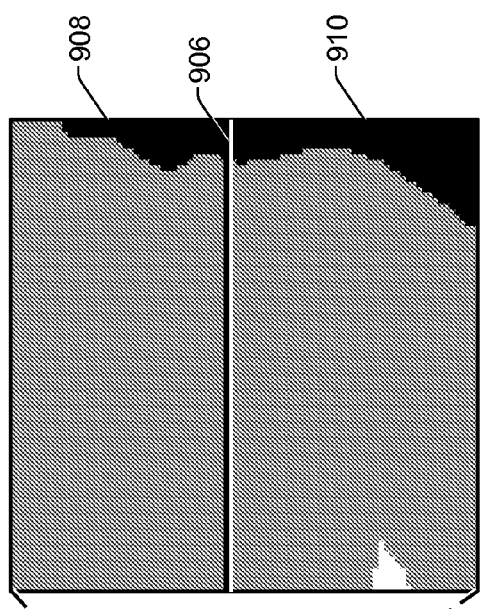
FIG. 9A
FIG. 9B
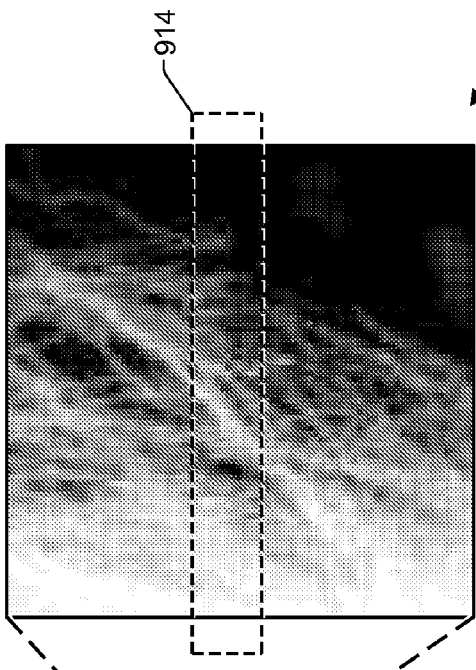
FIG. 9C
FIG. 9D

INTERACTIVE IMAGE MATTING

BACKGROUND

In image composition, a composite image can be created by combining a portion of a first image with a portion of a second image. For example, a foreground portion of a first image, such as a person or thing, can be lifted from the first image and placed over a second image which serves as a new background in the composite image. In order to combine these image portions correctly an associated matte (e.g., an alpha matte) that contains the coverage information (e.g., the shape of one or more portions being composited) is used to distinguish between the image portions. This technique, referred to as "image matting" or just "matting", is common in still image compositing, video special effects, computer vision and a variety of other graphics and image-manipulation applications.

Well-known matting techniques include blue-screen or green-screen matting in which an alpha matte and foreground portion of an image can be readily separated from the background of the image because the background is a single user-controlled color. In contrast, for natural image matting in which the background is not a single color, the alpha matte, the foreground and the background are estimated and identified using statistical techniques. Further, natural image matting is an intrinsically under-constrained problem due to the number of unknowns in the matting equation. Consequently, separation of the alpha matte, the foreground and the background for a given image using conventional matting techniques can be quite computation intensive.

Further, because image matting is an under-constrained problem, most existing approaches rely on a "trimap" provided with an image or generated from the image that identifies at least some of a definite foreground, a definite background and/or an unknown region. A sufficiently defined trimap can assist in achieving a quality matte by reducing the number of unknown elements. Further, when matting is performed interactively by a user using a user interface, the capability of providing instant feedback to the user can be helpful because the user is able to refine the trimap as the matte is rendered until a satisfactory result is obtained. For example, providing real time feedback to a user can significantly shorten the overall matting process time and reduce user effort since the user is able to quickly identify locations where touchups are desired. Also, a highly responsive system can provide a more fluid user experience and avoid user frustration. Unfortunately, most conventional high quality matting approaches are computationally expensive and unable to provide responses in real time.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide for interactive image matting based on input received through a user interface. For example, the user interface may provide input tools for identifying one or more regions of the image for use as a trimap. Additionally, some implementations may employ kernels of variable size during matting processing to quickly propagate matting information and provide feedback or results in real time to the user interface. Further, because the feedback may include results provided in real time, the user interface also enables the user to refine or modify the matte interactively.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIGS. 9A-9H illustrate the effect of local-global-local processing according to some implementations.

DETAILED DESCRIPTION

Fast Image Matting

Figure 1:
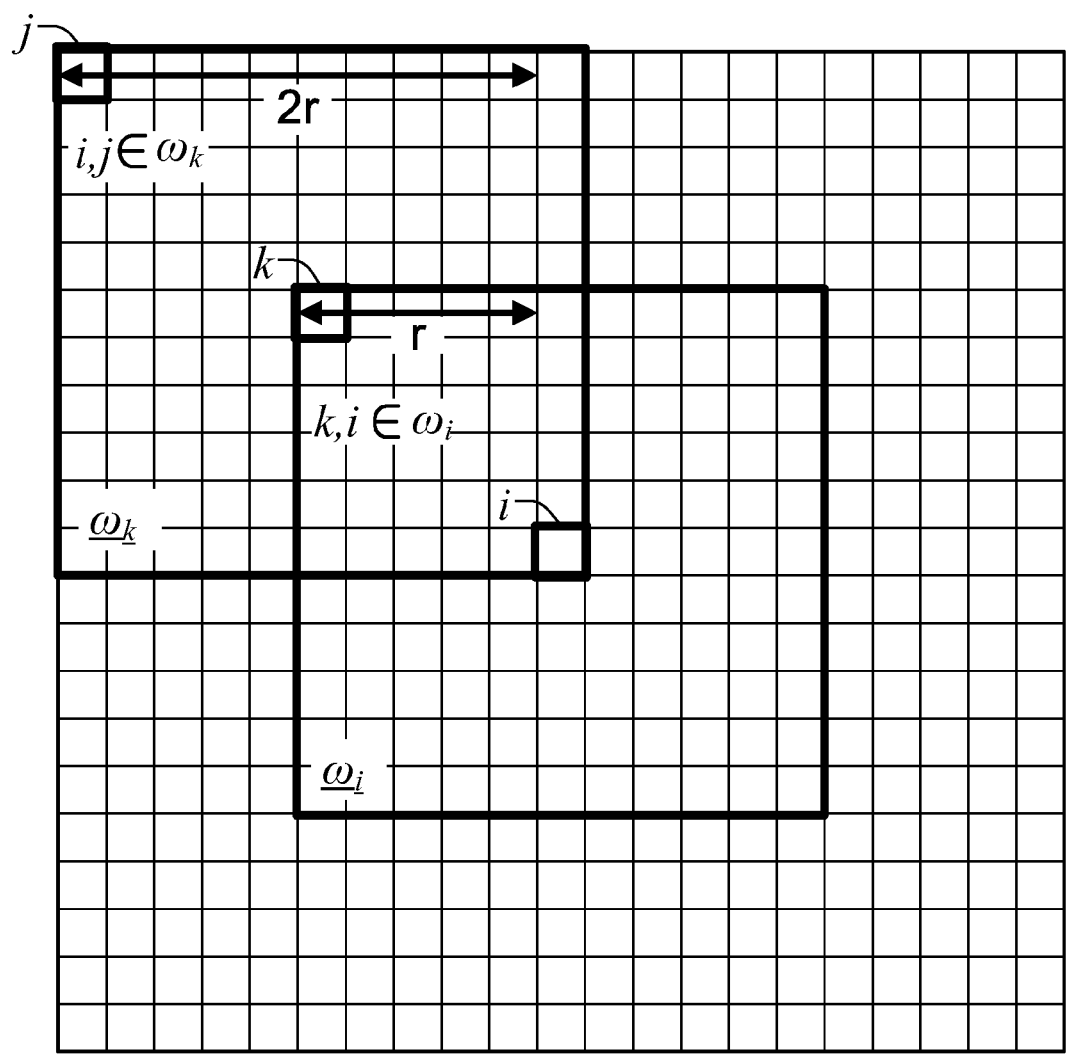
FIG. 1 illustrates an example of a kernel according to some implementations herein.

The technologies described herein are generally directed towards image matting to enable separation of a foreground portion of an image from a background portion of the image. For example, a foreground object can be lifted or pulled from an input image and then placed over a background provided by another image. Implementations herein may be applied to natural image matting in which the background is difficult to distinguish from the foreground being extracted. For instance, some implementations may be applied when the boundary between the foreground and the background is a soft boundary, such as is produced when hair or other complex structures extend in the boundary region between portions of the image that are clearly the foreground and clearly the background.

Some implementations provide interactive tools and techniques for extracting high quality alpha mattes from high-resolution images. Implementations may include a painting-based user interface and a highly efficient matting process that provides results as feedback to a user in real time. The user interface may seamlessly integrate two types of brush tools, namely, a selecting brush and one or more matting brushes, for effectively handling different kinds of object boundaries. The efficient matting computation techniques herein enable instant feedback during the matting process. Consequently, a high quality alpha matte and new composition can be quickly "painted" or "brushed" on a range of multi-megapixel images.

According to some implementations, the selecting brush can be used with fixed-width boundaries because only causal strokes far from the object boundary may be used. Further, the matting brush is suitable for complex boundary regions, such as for identifying hairy, fuzzy or other complex or soft boundary regions. Using the different brush types and the user interface herein, a high quality alpha matte and/or new composition can be almost instantly computed and displayed as feedback following each mouse drag operation or other user input. The two brush types may be seamlessly integrated so that the user can use either at any time to effectively handle all kinds of boundaries. Providing real time feedback is non-trivial on high-resolution images since, for example, the radius of the brush could easily be several hundreds of pixels. Additionally, using small brush sizes for image interaction may be undesirable, as locally solving the alpha matte in a region that is too small can lead to bad local minima, errors or artifacts. Furthermore, to support the user interface and further accelerate the matting optimization, implementations herein may include localized integral image processing, adaptive coarse-to-fine approximation, and relatively large-kernel foreground estimation, as described additionally below.

Since the matting problem is highly ill-posed, in some implementations, a trimap (or strokes) indicating definite foreground, definite background, and unknown regions may be provided by a user or an application. Efficiency is also a consideration for image matting, especially when applied to large multi-megapixel images produced by conventional digital cameras. Implementations herein are able to quickly and efficiently infer the alpha matte in the unknown regions of an image, and are able to handle complex cases like hair. Some implementations can be applied to interactive image matting in which the matte is formed in real time as a user indicates regions of the trimap on a display.

Some implementations herein provide a technique for high quality image matting using relatively large-kernel matting Laplacian matrices that is substantially faster than conventional techniques. A Laplacian matrix (sometimes referred to as an admittance matrix) is a matrix representation of affinity between pixels based on color. Some implementations are based on an efficient method to solve a linear system using a large kernel matting Laplacian. Kernel size refers to the size of the portion of the image being processed, i.e., comprising a number of pixels around a pixel of interest. According to some implementations herein, using a relatively large kernel size accelerates the constraint propagation, reduces the time of the linear solver for convergence, and improves the matting quality. To further speed-up the matting process and reduce computation time, some implementations employ a segmentation technique to decompose the trimap into sub-trimaps and to enable assigning an adaptive kernel size to each sub-trimap. Thus, the number of iterations can be fixed beforehand and the running time of the entire process can be essentially linear to the number of the unknown pixels. Testing has demonstrated that implementations herein may be 5 to 20 times faster than conventional techniques while achieving high matting quality. Implementations can also be useful for other applications employing the matting Laplacian, such as haze removal, spatially variant white balance, and intrinsic images.

Large Kernel Matting Laplacian

For a color image, the foreground F and the background B can be specified as color components together with an alpha channel matte a. For example, in the red, green, blue (RGB) color model, the image may be expressed as a matrix, as follows:

$$\begin{Bmatrix} & \alpha & \\ F_r & F_g & F_b \\ B_r & B_g & B_b \end{Bmatrix}$$

An alpha channel has various uses, including, for example, masking objects, making them transparent, or adding specific color instructions. In the $\{\alpha, F, B\}$ matrix, the alpha channel is a matte that distinguishes the foreground and background in an RGB image. As described herein, a user may construct such a matrix for an image through a process referred to as matting, which aims to find an appropriate a and F. For example, in the alpha matte, an alpha value of 1 typically indicates a foreground region and an alpha value of 0 typically indicates a background region.

Image matting is inherently under-constrained because the matting equation has too many unknowns. Therefore, user interaction is often used to obtain a quality matte. For example, in natural image matting, a user may supply a trimap that partitions the image into three regions: "definitely foreground", "definitely background" and "unknown region". The unknown region is typically the boundary between the definite foreground and definite background. In some implementations, the user may identify definite foreground and/or definite background using various interfaces and input devices. For example, a user may use a mouse or other input device to make one or more strokes, scribbles or clicks on an image to indicate a foreground portion and/or a background portion of an image. Further, in some implementations, the trimap may be partially or entirely automatically generated. For example, a user may positively identify a part of a foreground and a part of a background, with a trimap being automatically generated based on this identification. In some implementations, the user may use the input device to positively identify the unknown region or boundary. In other implementations, a trimap may be automatically generated based on a previous image in a sequence of images, such through motion estimation. Other variations will also be apparent in light of the disclosure herein.

For each pixel in an input image having a foreground color (F), a background color (B), and a foreground opacity (alpha matte α), the pixel's color I can be expressed as a convex or linear combination of the foreground and background colors as follows:

$$I = F\alpha + B(1-\alpha) \quad (1)$$

The matting Laplacian matrix is an affinity matrix applicable to image matting. One assumption of Laplacian matting is the color line model, namely, the foreground (or background) colors in a local window lie on a single line in the RGB color space. That α is a linear transformation of I in the local window is proved by the following equation:

$$\alpha_i = a^T I_i + b, \forall i \in \omega \quad (2)$$

where i is a pixel index, $I_i$ and a are 3×1 vectors, $a^T$ is the transpose of vector a, and a and b are assumed to be constant in the local window ω, in which a=1/(F−B), and b=−B/(F−B). Accordingly, a cost function J(α, a, b) can be defined to support the alpha obeying this model:

$$J(\alpha, a, b) = \sum_{k \in I} \left( \sum_{i \in \omega_k} (\alpha_i - a_k^T I_i - b_k)^2 + \varepsilon a_k^T a_k \right) \quad (3)$$

where $\omega_k$ is the window centered at pixel k, and ε is a regularization parameter. By minimizing the cost function with respect to (a, b), a quadratic function of α can be obtained:

$$J(\alpha) = \alpha^T L \alpha \quad (4)$$

Here α is denoted as an N×1 vector, where N is the number of unknowns, and the matrix L is called the "matting Laplacian". The Laplacian matrix L is an N×N symmetric matrix whose (i, j) element may be expressed as:

$$L(i,j) = \sum_{k|(i,j) \in \omega_k} \left( \delta_{i,j} - \frac{1}{|\omega_k|} \left( 1 + (I_i - \mu_k)^T \left( \Sigma_k + \frac{\varepsilon}{|\omega_k|} U \right)^{-1} (I_j - \mu_k) \right) \right) \quad (5)$$

where i j is the Kronecker delta, $\mu_k$ and $\Sigma_k$ are the mean and covariance matrix, respectively, of the colors in window $\omega_k$, $|\omega_k|$ is the number of pixels in the window $\omega_k$, and U is a 3×3 identity matrix.

Combining this cost function with the user-specified constraints (e.g., the trimap), the whole cost function may be defined as:

$$E(\alpha) = \alpha^T L \alpha + \lambda(\alpha - \beta)^T D (\alpha - \beta) \quad (6)$$

where β is the trimap, D is a diagonal matrix whose elements are one for constraint pixels and zero otherwise, and λ is a large number to enforce a hard constraint for the known pixels. A data term specified by color sampling confidence or a sparsity prior can also be incorporated in some implementations. The cost function of equation (6) can be optimized by solving a sparse linear system:

$$(L + \lambda D)\alpha = \lambda D \beta \quad (7)$$

The techniques of haze removal, spatially variant white balance, and intrinsic images also involve this linear system. Given this linear system, implementations herein provide a matting component that uses an appropriate linear system solver to recover α, as described below. Non-iterative methods, such as LU (lower-upper) decomposition are typically not effective to handle this linear system in large scale due to the high memory cost. Further in conventional iterative methods, the information of the known pixels is propagated into the unknown region by iteratively multiplying the matrix. However, iterative methods are often time consuming, and another drawback of the iterative methods is that the time to carry out the computations is difficult to predict because the number of iterations depends on the number of unknowns, the image content, and the trimap shape. Thus, conventional iterative methods are typically not suitable for interactive image matting.

Further, conventional methods usually use a small window or kernel because the matrix will be less sparse with a larger window. Conventional thought holds that solving a less sparse system takes more time. However, according to some implementations herein, this is not necessarily true. Thus, according to some implementations herein, solving a less sparse system takes fewer iterations to converge, with the only bottleneck being the increased computational burden in each iteration. Thus, implementations herein are able to greatly reduce the time for each iteration, so the image matting component may actually be faster when a larger window or kernel is used.

FIG. 1 depicts a 21×21 pixel kernel 100 for discussion purposes, having a pixel i located at its center. The kernel size of a matting Laplacian is defined as the number of the non-zero elements in a row of L. In equation (5), the window radius of the window ω may be denoted by a "radius" r. Then the kernel size may be defined as $(4r+1)^2$. As set forth in equation (5), the (i, j) element of L is non-zero only if $(i,j) \in \omega_k$. According to some implementations herein, as illustrated in FIG. 1, when the radius of the window ω is r, the radius of the kernel centered at i is 2r. Thus, kernel 100 includes a first window $\omega_i$ of radius r having pixel i located at its center and a second window $\omega_k$ having a pixel k located at its center. Both pixel i and pixel j are elements of window $\omega_i$ and pixel i and pixel k are elements of window $\omega_i$. Thus, pixel i is influenced by pixel j, which is 2r from pixel i.

Existing methods typically use r=1 (i.e., a 3×3 pixel window) because L will become less sparse when r is larger, and both the memory and the time to solve the linear system increases tremendously. For example, in the case of the conjugate gradient (CG) method for solving a linear system, the CG solver iteratively multiplies the conjugate vector by the Laplacian matrix. (See, e.g., Y. Saad, "Iterative methods for sparse linear systems," SIAM, 2003, page 178, for an example of a CG solver.) In each iteration, the matrix product Lp dominates the computation cost. Here p is the conjugate vector of the previous iteration. In the view of signal processing, the matrix product Lp is the response of a spatially variant filter L on p, whose ith element is:

$$(Lp)_i = \Sigma_j L_{ij} p_j \quad (8)$$

Computing Lp using equations (5) and (8) involves spatially variant convolution, whose time and memory complexity is $O(Nr^2)$. This is not computationally affordable when r gets larger. However, according to implementations herein, in each iteration a pixel can influence another pixel that is 2r away. So the information is propagated according to 2r pixels. Consequently, the CG solver will converge in fewer iterations if the kernel size is larger.

Implementations herein may employ an O(N) time process (that is independent of r) to compute the product Lp in each iteration. Because the process is independent of r, the process is in some aspects independent of window size or kernel size, and thus, it becomes more efficient to process large sized kernels. Further, instead of computing L's elements and the convolution explicitly, implementations herein calculate the product Lp as a whole using equations (9), (10) and (11), as set forth below. Thus, according to implementations herein, given a conjugate vector p, Lp can be calculated through the following three equations:

$$a_k^* = \Delta_k^{-1}\left(\frac{1}{|\omega|}\sum_{i\in\omega_k} I_i p_i - \mu_k \bar{p}_k\right) \quad (9)$$

$$b_k^* = \bar{p}_k - a_k^{*T}\mu_k \quad (10)$$

$$(Lp)_i \equiv q_i = |\omega|p_i - \left(\left(\sum_{k\in\omega_i} a_k^*\right)^T I_i + \left(\sum_{k\in\omega_i} b_k^*\right)\right) \quad (11)$$

where $a^*_k$ is a 3×1 vector for each pixel k, $\bar{p}_k$ is the mean of p in $\omega_k$, $$\Delta_k = \Sigma_k + \frac{\varepsilon}{|\omega_k|}U,$$

and $(Lp)_i$ is denoted as $q_i$. As mentioned above, equations (9)-(11) are independent of the window radius r, and therefore are independent of widow or kernel size. Accordingly, some implementations herein carry out image matting based on the value q, given by equations (9), (10) and (11), being equivalent to the value Lp in the equations (5) and (8) discussed above. The theorem and proof for this equivalence are set forth below.

Theorem: The value q given by equations (9), (10) and (11) is identical to the value Lp calculated by equation (5) and equation (8) set forth above.

Proof: Written in matrix notation, from equation (9) there is an affine transform:

$$a^* = Ap \quad (12)$$

where A is a coefficient matrix dependent on I. When equation (9) is combined with equation (10), it can be seen that b* is also p's affine transform: b*=Bp. Similarly, q is p's affine transform: q=Qp.

Consequently, in order to show q=Lp, it can be shown that $\partial q_i / \partial p_j = L(i, j)$. Putting equation (10) into equation (11) and eliminating b, provides:

$$\frac{\partial q_i}{\partial p_j} = |\omega|\delta_{ij} - \sum_{k\in\omega_i}\left(\frac{\partial \bar{p}_k}{\partial p_j} + \frac{\partial a_k^{*T}}{\partial p_j}(I_i - \mu_k)\right) \quad (13)$$

which provides:

$$\frac{\partial \bar{p}_k}{\partial p_j} = \frac{1}{|\omega|}\sum_{n\in\omega_k}\frac{\partial p_n}{\partial p_j} = \frac{1}{|\omega|}\delta_{j\in\omega_k} = \frac{1}{|\omega|}\delta_{k\in\omega_j} \quad (14)$$

where $\delta_{j\in\omega_k}$ is 1 if $j\in\omega_k$, and is 0 otherwise. Additionally, equation (9) provides:

$$\frac{\partial a_k}{\partial p_j} = \Delta_k^{-1}\left(\frac{1}{|\omega|}\sum_{i\in\omega_k}\frac{\partial p_i}{\partial p_j}I_i - \frac{\partial \bar{p}_k}{\partial p_j}\mu_k\right) \quad (15)$$

$$= \Delta_k^{-1}\left(\frac{1}{|\omega|}I_j - \frac{1}{|\omega|}\mu_k\right)\delta_{k\in\omega_j}.$$

Putting equation (14) and equation (15) into equation (13) provides:

$$\frac{\partial p_i}{\partial p_j} = |\omega|\delta_{ij} - \frac{1}{|\omega|}\sum_{k\in\omega_i, k\in\omega_j}(1 + (I_j - \mu_k)^T\Delta_k^{-1}(I_i - \mu_k)) \quad$$

which is exactly L(i, j) in equation (5).

The process herein also has intuitive interpretations: Equations (9) and (10) are linear regression solutions and the regression model may be expressed as $p_i \approx a_k^{*T}I_i + b_k^*$, $\forall i \in \omega_k$. Further, equation (11) can be rewritten as:

$$(Lp)_i = \sum_{k\in\omega_i}(p_i - (a_k^{*T}I_i + b_k^*)) \quad (16)$$

where, for any pixel $I_i$, the term $(p_i-(a_k^{*T}I_i+b_k^*))$ is the error between $p_i$ and its linear prediction. As $I_i$ is involved in all the regression processes satisfying $k\in\omega_i$, equation (16) is the sum of errors in all windows around i.

All the summations in (9) and (11) can be very efficiently computed using an integral image technique (see, e.g., Crow, F. C., "Summed-area tables for texture mapping," SIGGRAPH, 1984). Using the integral image, the sum of any window can be obtained in constant time (e.g., four operations). For example, once a summed area table has been computed for an image, any rectangle can be evaluated in constant time with just four array references. Therefore, the time complexity for computing Lp in each iteration is O(N') ≈O(N), where N' is the size of the bounding box of the unknown region. Consequently, it may be seen that the time complexity is also independent of the kernel size.

Example Framework

Figure 2:
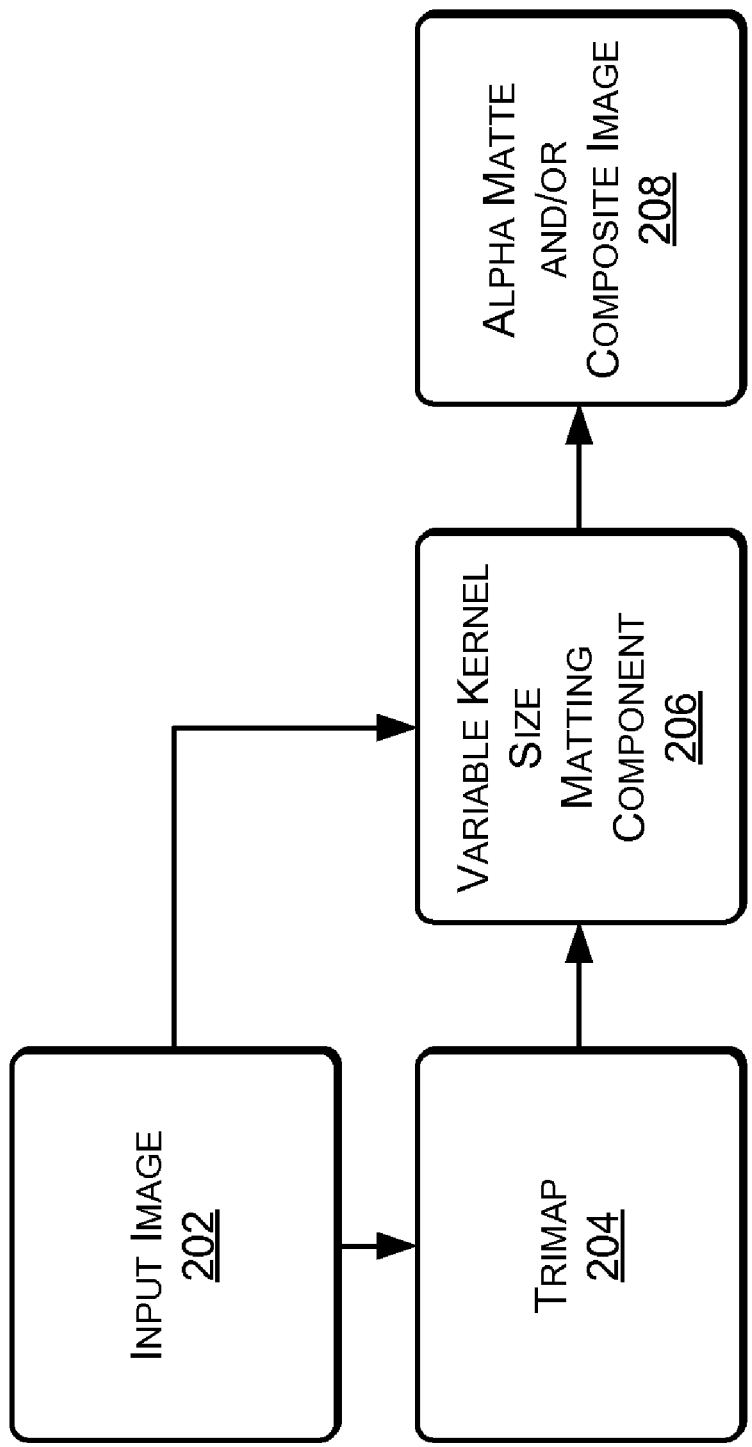
FIG. 2 is a block diagram of a framework for image matting according to some implementations.

FIG. 2 illustrates an example of a framework 200 for image matting according to some implementations herein. The framework 200 receives an input image 202 for processing. As an example, the input image 202 may have one or more foreground objects that a user would like to pull from the input image 202, such as for placing over a background of another image (not shown), or the like. The input image 202 may be used to generate a trimap 204 that is provided to a variable kernel size matting component 206. For example, in some implementations, a user may generate the trimap from the image interactively, such as by using a mouse and a user interface (not shown in FIG. 2) to designate a definite foreground region, a definite background region, and a boundary or unknown region. In other implementations, the trimap may be generated automatically or partially automatically based on user input. In other implementations, the trimap may be generated in advance, such as by the user, by an application, or the like. For example, in the case of a series of video images the trimap may be generated automatically by an application, such as based on motion estimation from a previous frame, and so forth.

The trimap and the input image are provided to the variable kernel size matting component 206 to process the image using equations (9), (10) and (11), as described above, to produce an alpha matter and/or composite image 208. Thus, for each pixel i in the unknown region, the variable kernel size matting component 206 determines the value $q_i$ based on a conjugate vector p of a previous iteration. As mentioned above, because the computation is independent of the window radius r and the kernel size, relatively large kernel sizes (e.g., 5×5 pixels or larger) may be used for processing each pixel, thereby achieving a high quality matte with a shorter computation time that conventional techniques.

Figure 3A:
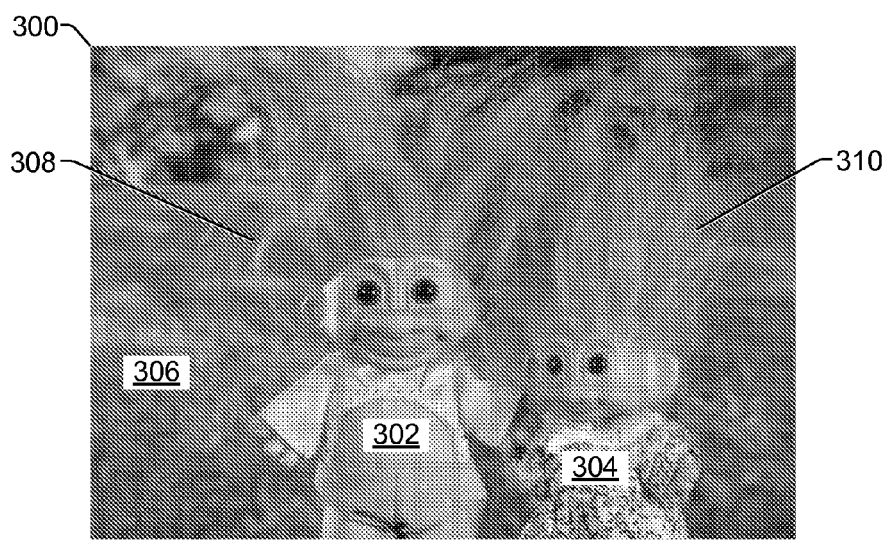
FIGS. 3A-3C depict an example of image matting according to some implementations.
Figure 3B:
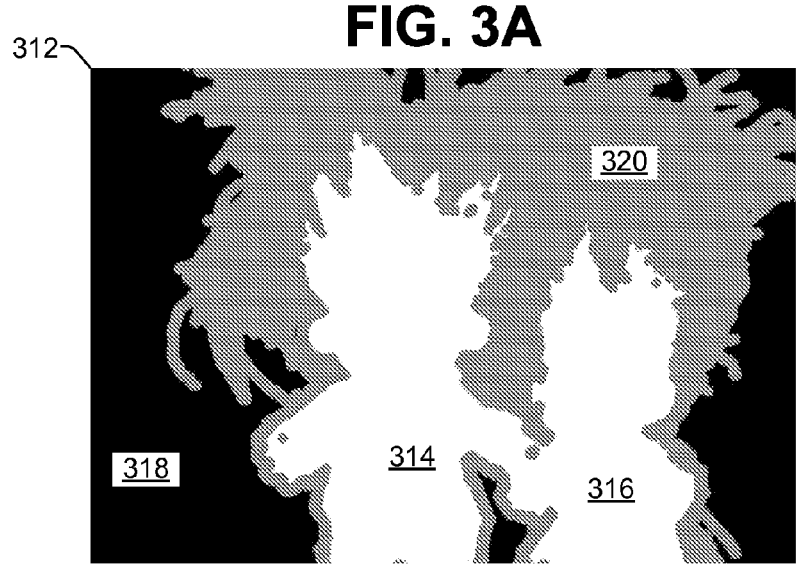
Figure 3C:
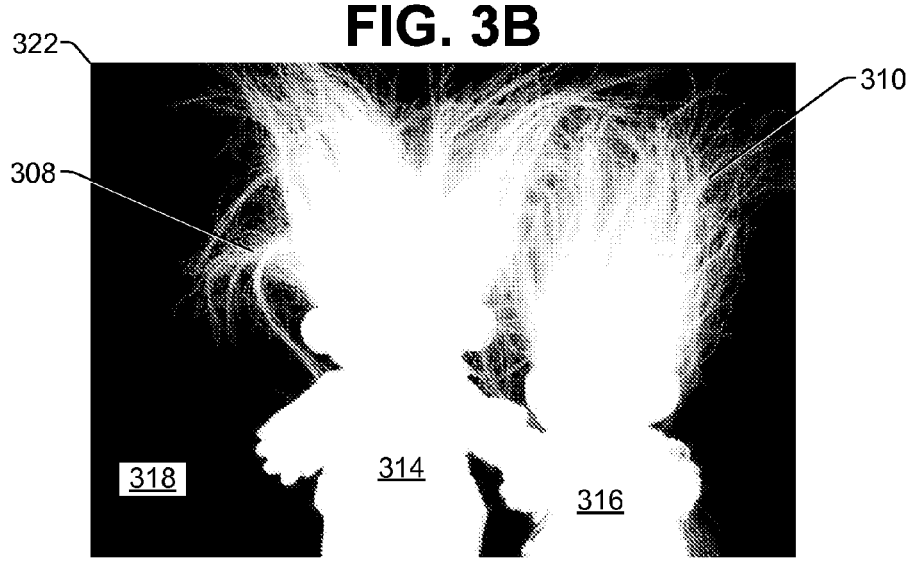

FIGS. 3A-3C depict an example of an input image 300 illustrating matting processing according to the framework of FIG. 2. As depicted in FIG. 3A, the input image 300 includes two dolls 302, 304 as foreground objects on a natural background 306. The dolls 302, 304 include hair 308, 310 that can be difficult to distinguish from the background 306. FIG. 3B is a trimap 312 corresponding to FIG. 3A, including definite foreground regions 314, 316, definite background regions 318 and a boundary or unknown region 320. A mentioned above, in some implementations the trimap may be generated interactively by a user, such as with a mouse or other input device. In other implementations, the trimap 312 may be generated automatically or semi-automatically, or generated in advance of receiving the input image 300. FIG. 3C depicts the alpha channel or alpha matte 322 extracted from input image 300 using an implementation of the matting process herein based on equations (9), (10) and (11) described above, that is independent of kernel size and window radius r. The process has clearly defined the details of the unknown region 320 of the trimap as either background 318 or foreground 314, 316, including the hair structure 308, 310.

Figure 4:
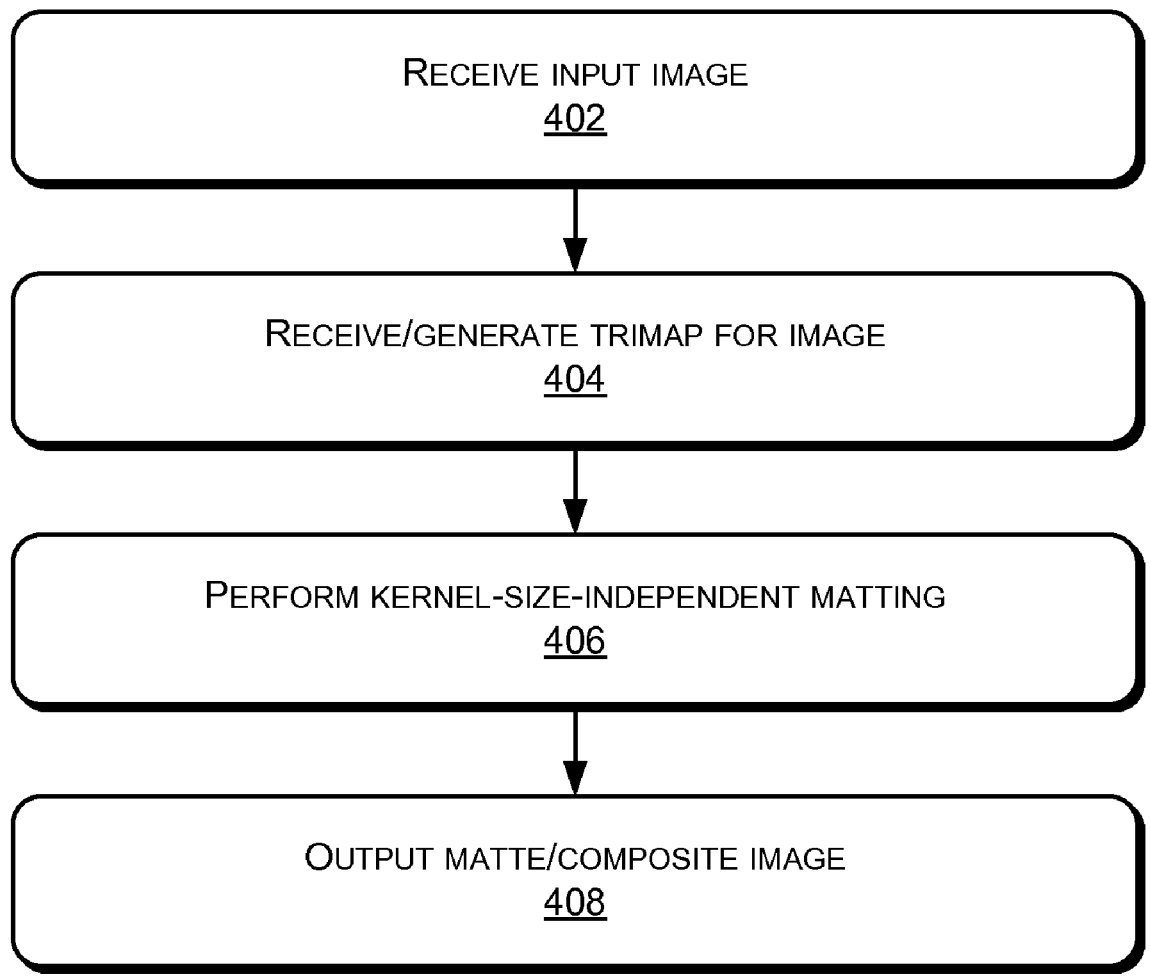
FIG. 4 is a flow diagram of an example process for image matting according to some implementations.

FIG. 4 depicts a flow diagram of an example process 400 for image matting according to some implementations herein. In the flow diagram, the operations are summarized in individual blocks. The operations may be performed in hardware, or as processor-executable instructions (software or firmware) that may be executed by one or more processors. Further, the process 400 may, but need not necessarily, be implemented using the framework of FIG. 2.

At block 402, an input image is received for processing. For example, the matting components and processing described herein may be part of a computer program application or software package such as an image processing application, a photograph editing application, a presentation application, a word processing application, a video editing application, or the like.

At block 404, a trimap corresponding to the input image is received or generated for the image. For example, as described above with reference to FIG. 3, the trimap identifies definite foreground areas, definite background areas, and an unknown boundary area.

At block 406, matting processing of the image is performed based on equations (9), (10) and (11) described above in a manner that is independent of the kernel size and window radius used during the processing. Thus, instead of computing the elements of the matting Laplacian L and the convolution explicitly, the product Lp is calculated as a whole using equations (9)-(11). Further, because the process is independent of kernel size a relatively large kernel size can be efficiently employed during the processing, thereby reducing the number of iterations carried out and increasing the speed of the overall process. The limits on the kernel size are discussed below and are based on maintaining the linearity of the system, rather than processing time, or the like.

At block 408, the alpha matte is generated as output. The alpha matte clearly indicates which parts of the input image are part of the selected foreground or part of the background. The alpha matte may be used for various applications, such as for transferring the selected foreground to a different background image to create composite image or for other purposes.

The above framework and process for image matting described herein may be implemented in a number of different environments and situations. Further, while several examples are described herein for explanation purposes, the disclosure is not limited to the specific examples, and can be extended to additional environments, applications and settings. For example, the matting processing herein may be used for other applications, such as haze removal, spatially variant white balance, intrinsic imaging, and the like.

Kernel Size

Figure 5:
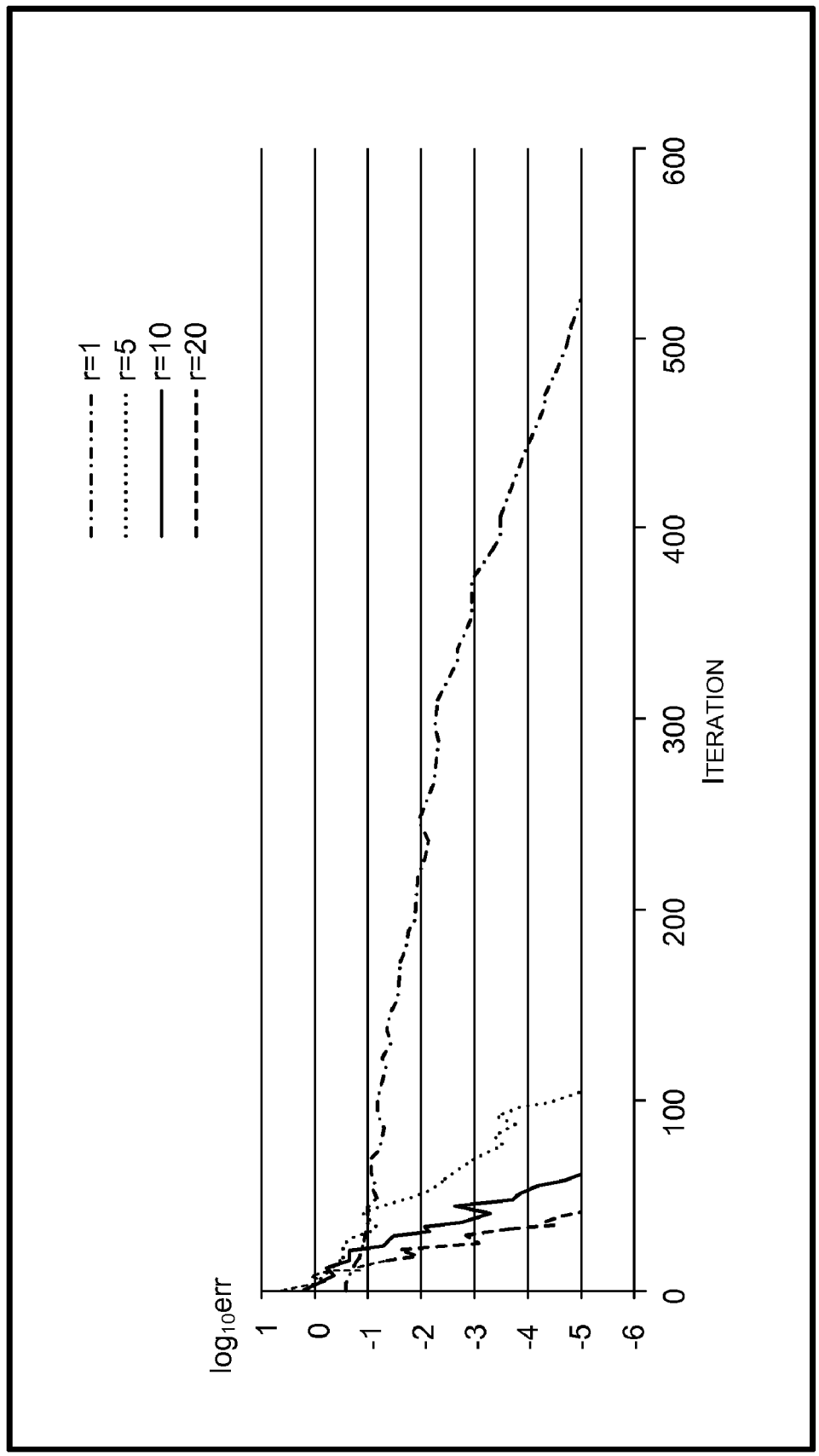
FIG. 5 is a graph illustrating examples of radius size relative to number of iterations to convergence according to some implementations.

FIG. 5 depicts a graph demonstrating the effect of different kernel sizes during processing on the same image according to implementations of the process described herein. As illustrated in FIG. 5, it may be seen that the solver converges much faster in the larger kernel cases. In this example, when the window radius r=1 the linear solver takes 519 iterations to converge, while when the window radius r=20, the solver only takes 44 iterations to converge, with the number of iterations for r=10 and r=5 also being substantially less than for r=1. Further, the running time (not shown in FIG. 5) is also substantially less for r=20 (e.g., 0.090 sec.) than for r=1 (e.g., 1.07 sec.), while the resulting mattes were visually almost identical. Consequently, by employing the above process, the running time of the linear solver can be substantially reduced when a relatively large kernel is used since the linear solver converges in fewer iterations. Further, as comparison with conventional techniques, the running time of a brute force CG solver using equations (5) and (8) for r=1 was found to be 0.95 sec. and for r=20 was found to be 22 sec.

A large kernel having a radius greater than r=1 can also improve the quality of the resulting matte because a large window may cover disconnected regions of the foreground/background. This property is particularly favored when the foreground object has holes through which portions of the background are visible. In such a case, when the radius is r=1, the radius may be too small to cover the known background and the holes. Thus, implementations herein can obtain a quality matte by using a larger window size, e.g., r=20. Further, the large kernel process herein may typically be more appropriate for high-resolution images. For example, a small window may not be sufficient to describe the fine lines or structures in an image, such as hairs, feathers, fuzz, etc., which can result in the loss of such fine structures. However, a large window enables collection of more color samples, and thereby achieves a higher quality result. Further, a larger window kernel also enables coverage of more known pixels near the boundary of unknowns and thereby provides more stable constraints. However, a drawback of a large kernel is that when the foreground/background is complicated, a larger window leads to a higher probability of breaking the color line assumption upon which equations (9)-(11) are based (i.e., equation (1)). For instance, if a window is so large that the window covers more than one color cluster of the background, the colors will not lie in the same line. Thus, an upper bound of the kernel size is limited based on maintaining linearity of the colors in the kernel. Consequently, the matte will not be as accurate as using a smaller window and may include artifacts. In practice, when creating a trimap, a user will create a wide band of unknowns near a fuzzy object or an object with holes, as it is difficult to provide a precise boundary, while, on the other hand, the band of unknowns created near a solid boundary tends to be relatively narrow. Further, the use of high-resolution images may also result in a wider band of unknowns. Accordingly, using a larger kernel enables efficient propagation of constraints in a wide band. However, for a narrow band, a smaller kernel may be favored to avoid breaking the color line assumption. To achieve this goal of using smaller kernels for narrower bands of unknowns and larger kernels for wider bands, implementations herein adaptively set the kernel size based on a trimap segmentation technique, as described below.

Example Framework with Trimap Segmentation

Figure 6:
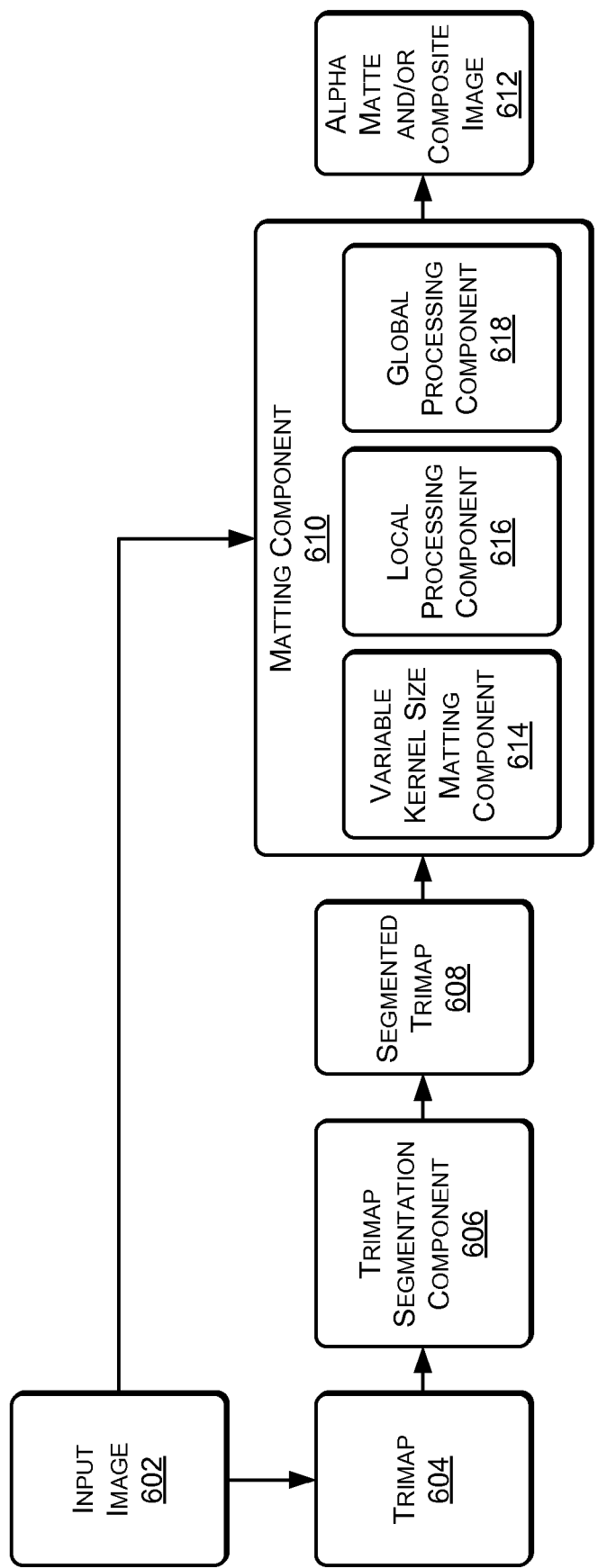
FIG. 6 is a block diagram of a framework for image matting with trimap segmentation according to some implementations.

FIG. 6 depicts an example of a framework 600 for image matting with trimap segmentation according to some implementations herein. The framework 600 receives an input image 602 for processing. As an example, the input image 602 may have one or more foreground objects that a user would like to pull from the input image 602, such as for placing over a background of another image (not shown), or the like. The input image 602 may be used to generate a trimap 604 or the trimap 604 may be received with the input image 602. For example, in some implementations, a user may generate the trimap interactively, such as by using a mouse and a user interface (not shown in FIG. 6) to designate a definite foreground region, a definite background region, and a boundary or unknown region. In other implementations, the trimap may be generated automatically or partially automatically based on user input. Further, the trimap 604 may be generated in advance, such as by the user, by an application, or the like.

The trimap 604 may be provided to a trimap segmentation component 606. Trimap segmentation component 606 performs segmentation of the trimap 604 to divide the trimap into smaller regions or segments to produce a segmented trimap 608. Through segmentation of the trimap, each segment can be processed individually using an optimal kernel size during the matting processing, as is described additionally below. The segmented trimap 608 and the input image 602 are provided to a matting component 610 to process the image to produce an alpha matte and/or composite image 612.

Matting component 610 may include a variable kernel size matting component 614 to perform the matting processing to separate the alpha matte from the background, as described above, based on formulas (9)-(11). In some implementations, variable kernel size matting component 614 corresponds to variable kernel size matting component 206 discussed above. Each segment in the segmented trimap may be processed using an optimal kernel size determined for the segment. As mentioned above, because the matting computation itself is independent of the kernel size, relatively large kernel sizes (e.g., 5×5 pixels or larger) may be used for processing each segment, thereby achieving a high quality matte with a shorter computation time that conventional techniques. Further, through trimap segmentation, the kernel size can be optimized to maintain linearity within each kernel.

Matting component 610 may further include a local processing component 616 and a global processing component 618. Local processing component 616 and global processing component 618 may be provided to address artifacts and seams that may otherwise occur in the alpha matte due to the segmentation of the trimap. Thus, as is described additionally below, according to some implementations, the matte may be calculated during a first local pass for each segment using local processing component 616. Global processing component 618 may then be used to refine the matte during a global pass that solves the unknowns based on the entire trimap to remove transitions between segments. Finally, the local processing component 616 may be employed again to further refine the matte during a second local pass that performs additional processing on each of the segments of the segmented trimap. Other variations will also be apparent in light of the disclosure herein.

Trimap Segmentation

According to some implementations herein, trimap segmentation may further improve both the quality and efficiency of the image matting. Trimap segmentation enables different window or kernel sizes to be used in different regions. Thus, trimap segmentation reduces a large linear system into a set of smaller linear systems and thereby further reduces the running time for solving the entire system.

Figure 7A:
FIGS. 7A-7B illustrate an example of trimap segmentation according to some implementations.
Figure 7B:
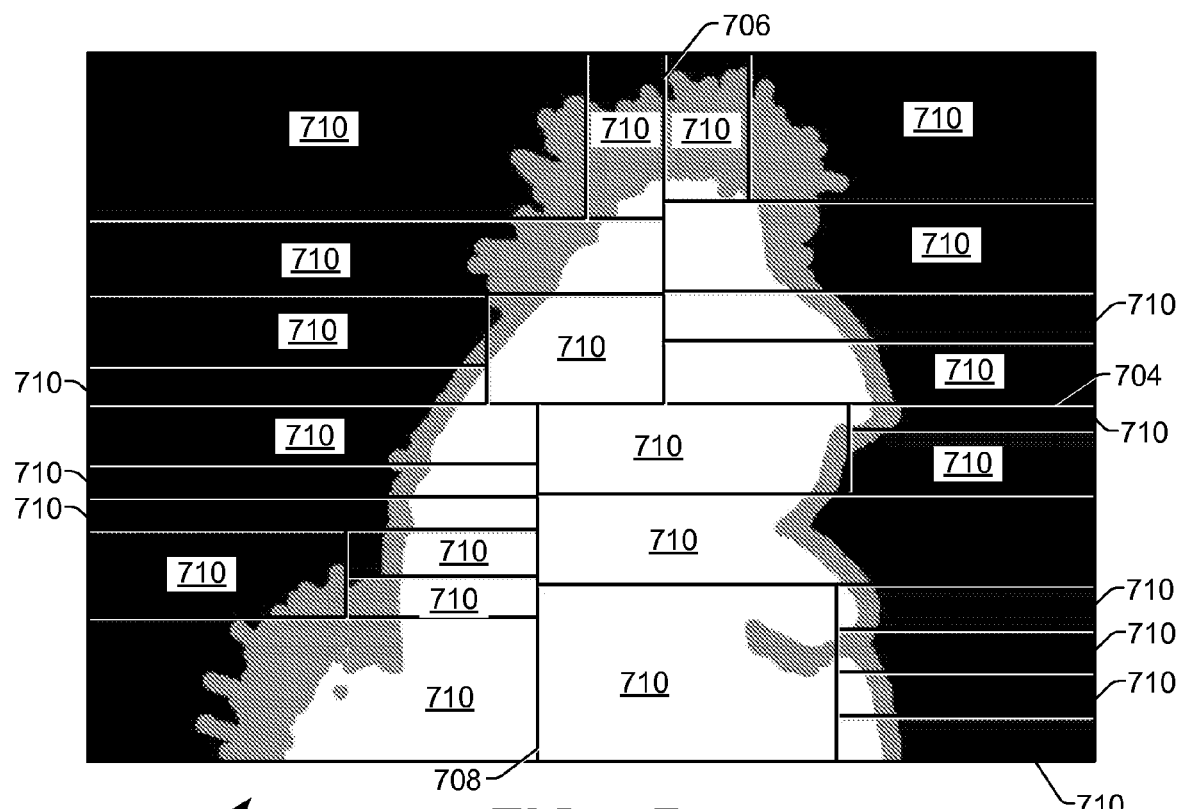

FIG. 7A illustrates an example input image 700, while FIG. 7B illustrates a corresponding trimap 702 for image 700. For a given trimap, implementations herein first calculate the unknown region's barycenter $(x_c, y_c)$, x variance $$\sigma_x^2 = \frac{1}{n}\Sigma_U (x_c - x)^2,$$

and y variance $$\sigma_y^2 = \frac{1}{n}\Sigma_U (y_c - y)^2,$$

where U is the set of unknown pixels, and n is the size of U. Then a line that passes through $(x_c, y_c)$ is used to divide the trimap into two areas. This line is perpendicular to the axis (either x or y) having a larger variance. For instance, in the illustrated example of FIG. 7B, the line 704 divides the trimap into two areas, these two areas are then divided into two more areas, by lines 706 and 708, respectively, each of those areas may be further divided into two more areas, and so forth, to divide the trimap 702 into a plurality of segments 710. Each segment 710 contains a portion of the unknown region and at least one of definite foreground region and definite background region. In some implementations, the trimap may be recursively divided and a two-dimensional tree data structure may be built accordingly. For example, in the tree data structure, the entire trimap serves as the root area and each time an area is subdivided into two sub-areas, two branches are added to the tree. Such a tree may be referred to as a binary space partitioning (BSP) tree or a two-dimensional k-dimensional (2D KD) tree. The tree data structure may be traversed for managing matting processing of the various segments of the trimap.

The conditions for stopping the recursive subdivision of the trimap may be determined as follows. If a subdivided area of the image covers enough foreground and background constraints, a reasonably good matte can be obtained by considering just this subdivided area of the image independently. Therefore, it is desirable for the segments to be small, while still having as many of segments as possible having both definite foreground (F) and definite background (B) constraints in addition to the unknown (U) region. Consequently, according to implementations herein, the recursive division of the trimap may be stopped when at least one of the following conditions is satisfied: (a) the segment only has F and U elements; (b) the segment only has B and U elements; (c) if the segment is divided, one of the segment's children will have only F and U elements, and the other child will have only B and U elements; or (d) The segment's minimum width or minimum height would be smaller than a predetermined threshold. Empirical data has shown 32 pixels to be a suitable threshold, although other suitable thresholds may also be used. It may be further noted that these conditions generally result in segmentation of the trimap such that the bandwidth of the unknowns in each segment is generally uniform.

According to some implementations, when the trimap has been segmented, the linear system in each segment can be solved as described above based on equations (9)-(11). The integral image is calculated in a bounding box of the unknowns in each segment. Implementations herein first solve the segments that satisfy the above conditions (c) or (d), as these segments directly contain both F and B constraints. Then, other segments (i.e., those segments that have only F and U, or only B and U) are solved, such as by using an inverse Breadth-First Search order on the tree data structure, i.e., in which the deeper leaves in the binary tree have a higher priority. Further, because these remaining segments do not contain one of an F or B constraint, implementations herein use an already-solved matte of a neighboring segment as boundary conditions. The inverse Breadth-First Search order ensures that at least one of the neighboring segments has already been solved, although other methods may also be used for determining an order to solve the various segments.

In addition, implementations herein adapt the kernel size used to solve each segment to the bandwidth of the unknowns in that segment. For example, for each segment, let (w, h) be the width and height of U's bounding box (i.e., a rectangle of a minimum size that encompasses all the unknown pixels in the particular segment). Implementations herein approximate the width of the band by $w_b=n/\max(w,h)$. Implementations herein set the window radius $r=w_b/\eta$, where $\eta$ is a factor that may be determined empirically. For example, experiments with implementations herein have shown suitable values for $\eta$ to range from 2 to 20, depending on desired window size. Intuitively, the propagation will influence the other side of the band in $\eta/2$ iterations (noting that the kernel radius is 2r). Therefore, the number of iterations for convergence is in the order of $\eta$, and can be fixed beforehand. For example, if the bandwidth of the unknown region of a first segment is approximately 50 pixels, i.e., $w_b=50$, then using a factor $\eta$ of 3, the window radius r=50/3 or 17 for processing the first segment (i.e., a kernel size of 69×69 pixels). On the other hand, when the bandwidth of a second segment is approximately 30 pixels, then the window radius r=10 for that segment (i.e., a kernel size of 41×41 pixels). Thus, implementations herein are able to assign a kernel size that is suitable for the particular segment for maintaining both a linear system and for achieving optimal processing speed. Consequently, the propagation speed is adaptive to the bandwidth of the unknown region in a particular segment. Further, the same number of iterations is able to provide high quality mattes for two bands of unknowns of different width.

Figure 8:
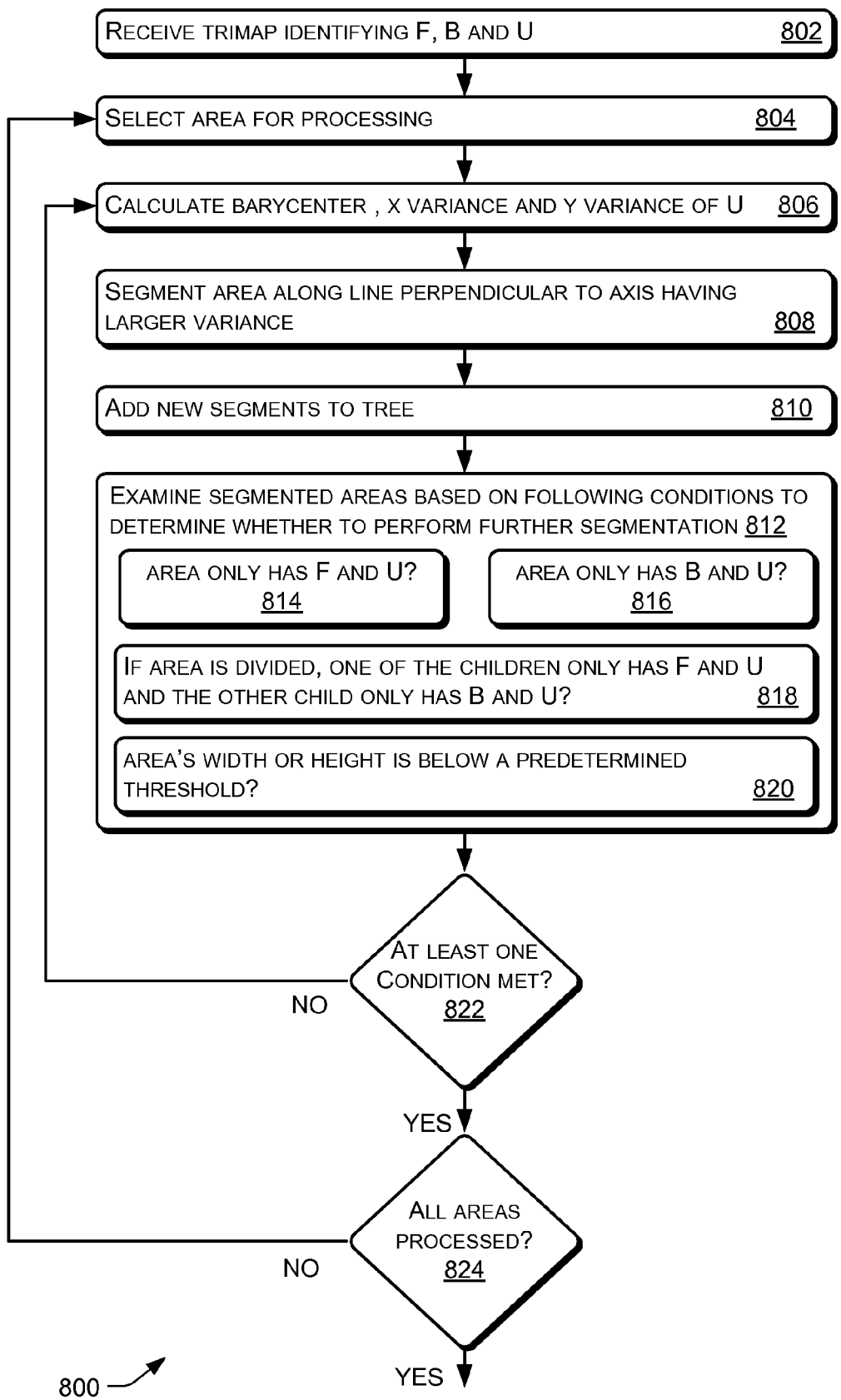
FIG. 8 is a flow diagram of an example process for trimap segmentation according to some implementations.

FIG. 8 depicts a flow diagram of an example process 800 for trimap segmentation according to some implementations herein. In the flow diagram, the operations are summarized in individual blocks. The operations may be performed in hardware, or as processor-executable instructions (software or firmware) that may be executed by one or more processors. Further, the process 800 may, but need not necessarily, be implemented using the framework of FIG. 6.

At block 802, a trimap of an image is received identifying a definite foreground portion F, a definite background portion B and a boundary or unknown portion U.

At block 804, the process selects an area of the trimap for processing. For example, when the trimap is first received the entire trimap is the area that is processed, whereas, subsequently, subdivided areas of the trimap are the areas selected for processing.

At block 806, the barycenter, x variance, and y variance are calculated for the unknown portion U of the selected area.

At block 808, the area is segmented along a line perpendicular to the axis having the larger variance.

At block 810, the two new segments created by segmenting the selected area are added to the tree data structure representing the trimap segmentation. As mentioned above, the tree data structure may be a BSP or 2D KD tree.

At block 812, the two new segmented areas are examined based upon specified conditions to determine whether to perform further segmentation on one or both of the segmented areas. Thus for each of the new segmented areas, the process determines whether at least one of the four following conditions has been met.

At block 814, the process determines whether the segmented area has only foreground F and unknown U elements.

At block 816, the process determines whether the segmented area has only background B and unknown U elements.

At block 818, the process determines whether, if the segmented area is divided, one of the children will have only foreground F and unknown U elements while the other child will have only background B and unknown U elements.

At block 820, the process determines whether the segmented area's width or height is below a predetermined threshold. As mentioned above, and this predetermined threshold may be determined experimentally. Implementations herein have shown that the threshold may be between 25 and 40 pixels, such as for example 32 pixels, although other threshold values may also be used.

At block 822, the process determines whether one or more of the above conditions have been met. If not, then the process returns to block 806 to process the area for which none of the conditions have been met. On the other hand, if at least one of the conditions is met for both of the newly segmented areas, then no further segmentations of these areas is desired and the process moves to block 824.

At block 824, the process determines whether all of the areas in the trimap have been processed. When all of the areas in the trimap have been segmented, the segmented trimap is ready for image matting processing.

Local-Global-Local Processing

To prevent the result from being overly locally determined, some implementations herein employ a local-global-local (LGL) scheme. Under this LGL scheme, following the trimap segmentation technique described above, a first local pass is performed which quickly solves the matte for each segment in the segmented trimap. Next a global pass is performed over the entire unsegmented trimap, and then a second local pass is performed over the segmented trimap to further refine the alpha matte.

Figure 9E:
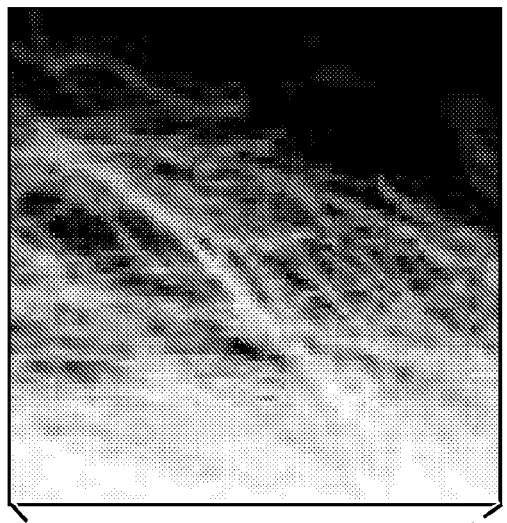
Figure 9F:
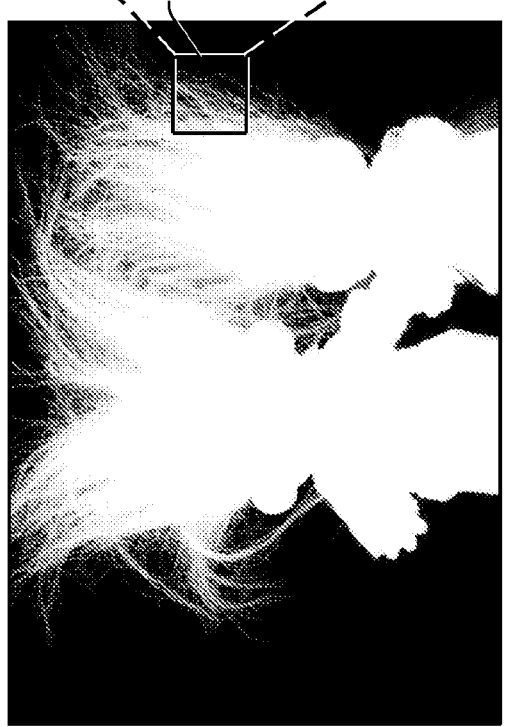

FIGS. 9A-9H depict an example of the execution and effect of the local-global-local processing scheme. FIG. 9A depicts a trimap 900 corresponding to the trimap 312 of FIG. 3B. The trimap 900 has been segmented using the trimap segmentation technique described above. Initially, a first local pass of the image is performed for each segment in the trimap 900 to generate an alpha matte 902, as depicted in FIG. 9C. For example, if $\eta=3$, then the matting component is able to quickly propagate initial matting information. Further, some implementations herein may empirically fix the number of iterations in the first local pass. For example, experiments have shown that 10 iterations is a suitable number of iterations for the first local pass sufficient to obtain a good initial alpha matte 902.

However, because the segments are processed individually to a certain extent, noticeable seams may exist on segment boundaries. FIG. 9B represents an enlarged region 904 of a segment boundary line 906 between a first segment 908 and a second segment 910. FIG. 9D represents an enlarged region 912 of alpha matte 902 corresponding to the location of enlarged region 904 of FIGS. 9A-9B. Close examination of the corresponding alpha matte 902 at the enlarged region 912 in area 914 reveals a noticeable transition between the two segments 908, 910 at the location of the segment boundary line 906.

Using the above-obtained alpha matte 902 as an initial guess, some implementations herein next optimize the whole linear system globally. Accordingly, for the global matting process, in some implementations, the window radius r is set to be min(w, h)/50 where w and h are the image's width and height in pixels, and 50 is an empirically determined value, although other suitable values may also be used. Further, the number of iterations to be carried out is fixed on a low number, such as five. This global processing produces a second alpha matte 916, as illustrated in FIG. 9E. As demonstrated by the enlarged area 918, of FIG. 9F, the noticeable transition between the segments is eliminated by the global processing.

Figure 9G:
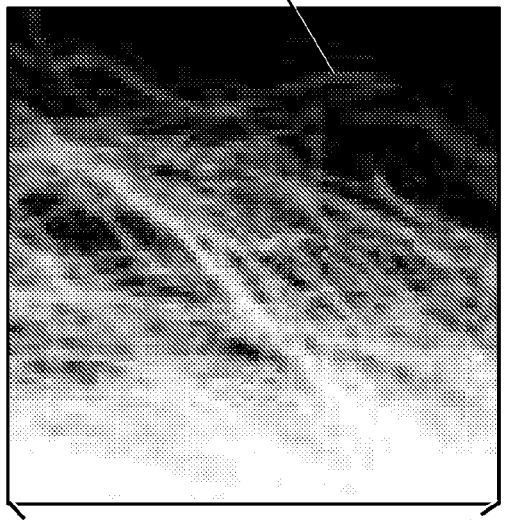
Figure 9H:
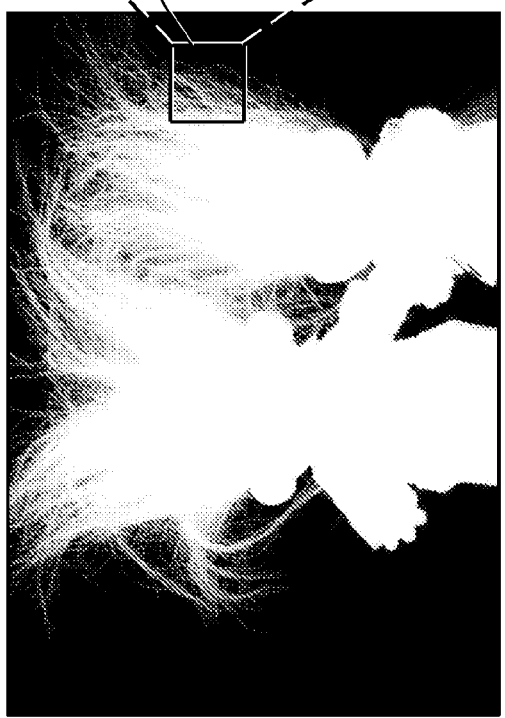

However, the kernel size used in the global processing may be too large for some local regions. Thus, because of the large kernel size, the alpha matte 916 may include artifacts or be missing some details due to the failure of the color line assumption. Consequently a second local processing pass may be executed to further refine the alpha matte 916 using the segmented trimap 900. As an example, in the second local pass, $\eta$ may be larger than in the earlier passes, such as $\eta=15$ and the number of iterations permitted may also be larger, such as 20 iterations. Experiments have shown that more iterations than 20 improve the result very little. Additionally, because $\eta$ is larger (i.e., 15 as opposed to 3), the window and kernel size is much smaller in the second local pass than in the first local pass so as to ensure that the color line model is maintained. This suppresses the occurrence of artifacts due to the large window size used in previous two steps, and can produce a third alpha matte 920, as illustrated in FIG. 9G. FIG. 9H depicts an enlarged portion 922 of alpha matte 920, showing that artifacts are eliminated and some details 924 are improved.

Time Complexity

The running time of implementations herein may be substantially linear to the image size thereby providing predictable performance and processing time based on image size. For example, if N' is denoted as the total area of all the bounding boxes of the unknowns in all segments, then the time complexity of the local steps is O(N') when the time for calculating Lp in each iteration is O(N') and the iteration number is fixed. For the same reason, the time complexity of the global step is O(M), where M is the size of the bounding box of the whole unknown region. Experiments have shown that the time for the global step is much less than that of the local steps due to the fewer number of iterations. Consequently, the total time complexity is essentially O(N'). Therefore, as N' is slightly larger than the number of unknowns N, the running time is almost linear to N. Accordingly, after the trimap is segmented, the time can be predicted based in the number of unknown pixels N before running the linear solver.

Example Matting Process with Trimap Segmentation

Figure 10:
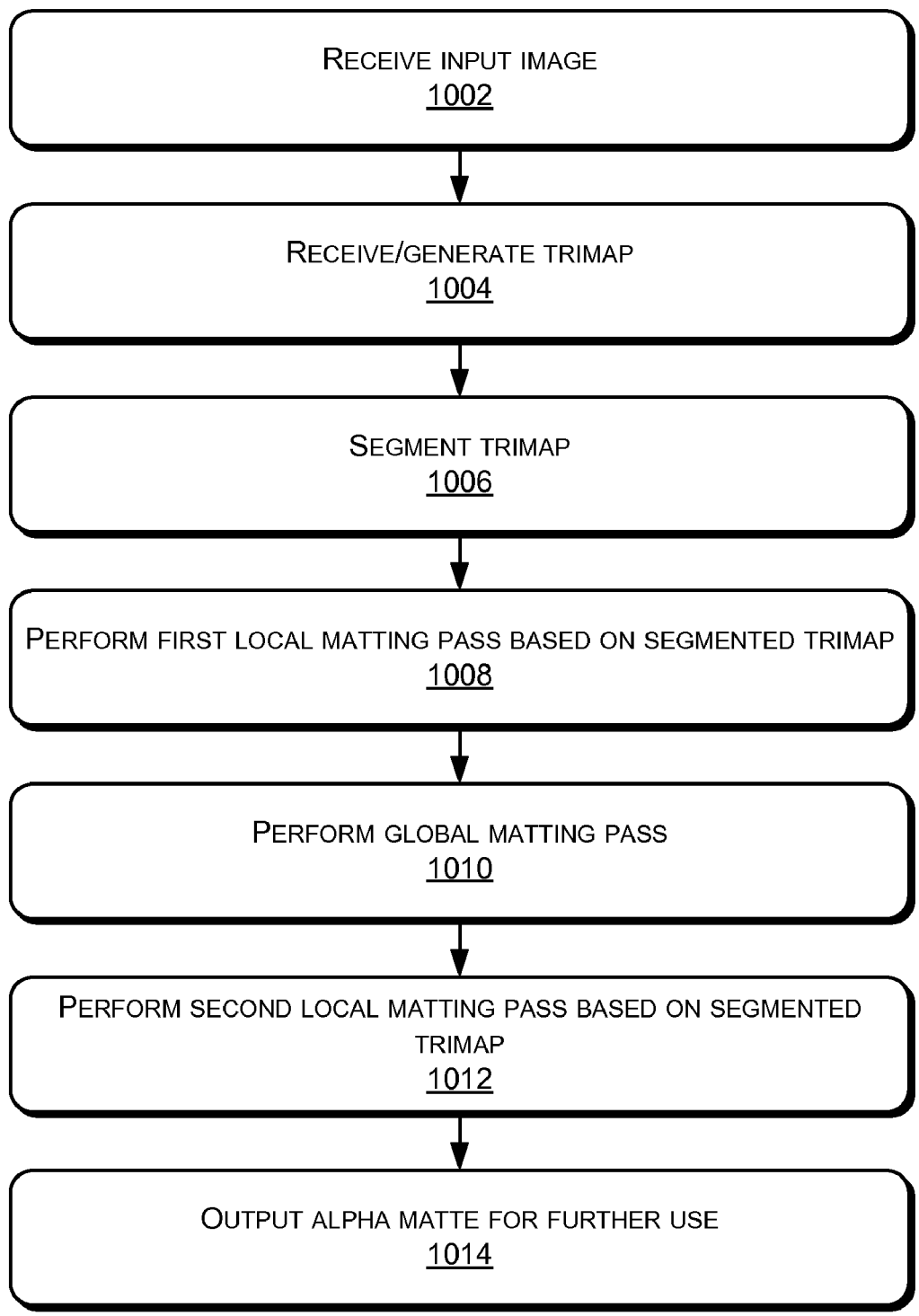
FIG. 10 is a flow diagram of an example process for image matting with trimap segmentation and local-global-local processing according to some implementations.

FIG. 10 depicts a flow diagram of an example of a matting process 1000 with trimap segmentation according to some implementations herein. In the flow diagram, the operations are summarized in individual blocks. The operations may be performed in hardware, or as processor-executable instructions (software or firmware) that may be executed by one or more processors. Further, the process 1000 may, but need not necessarily, be implemented using the framework of FIG. 6.

At block 1002, an input image is received for processing. For example, in some implementations, a high-resolution image having a foreground object on a natural background is received for pulling the foreground object and an alpha matte from the background of the image.

At block 1004, a trimap is received and/or generated for the input image. For example, in some implementations, a user may interactively assist in generation of the trimap using a user interface and an input device, such as a mouse. In other implementations, the trimap may be pre-generated by a user or an application, or provided by other methods.

At block 1006, the trimap is segmented as described above with reference to FIG. 8. For example, the trimap is segmented and a corresponding tree data structure is generated to enable traversal of the trimap segments during matting processing of the individual segments. Other methods of performing matting processing of the individual segments may also be used.

At block 1008, a first local matting processing pass is performed based on the segmented trimap. For example, this local pass may be a quick processing of the image using a low number of iterations and larger kernel sizes to obtain a first alpha matte.

At block 1010, a global matting processing pass is performed on the image based on the trimap without considering the segmentation. For example, the global pass may also be performed using a large kernel size and a relatively small number of iterations to refine the first alpha matte by removing transition areas between segments to obtain a second alpha matte.

At block 1012, a second local matting processing pass is performed based on the segmented trimap to further refine the second alpha matte. The second local pass may be performed using a smaller kernel size and a larger number of iterations than the first local pass for refining the second alpha matte to obtain a third alpha matte.

At block 1014, the third alpha matte is output, and may be used for further image processing. For example, the third alpha matte may be used to place the corresponding foreground object over a new background to create a composite image, or the like.

Example User Interface

Some implementations herein provide a user interface for interactive image matting. Based on the characteristics of an object boundary, the user interface may provide two different types of interactive tools or "brushes" controllable by a user, such as by using a mouse, joystick or other input device. The brushes may appear in the user interface as mouse-controllable cursors or icons, each having a distinct shape to enable a user to distinguish between brush type, and moveable over a displayed image for interacting with the image. Thus, the user interface may provide a first brush type referred to herein as a "selecting brush" to interact with or identify fixed-width boundaries. The user interface may also provide a second brush type referred to herein as a "matting brush" to interact with or identify complex or soft boundaries.

Selecting Brush

Figure 11B:
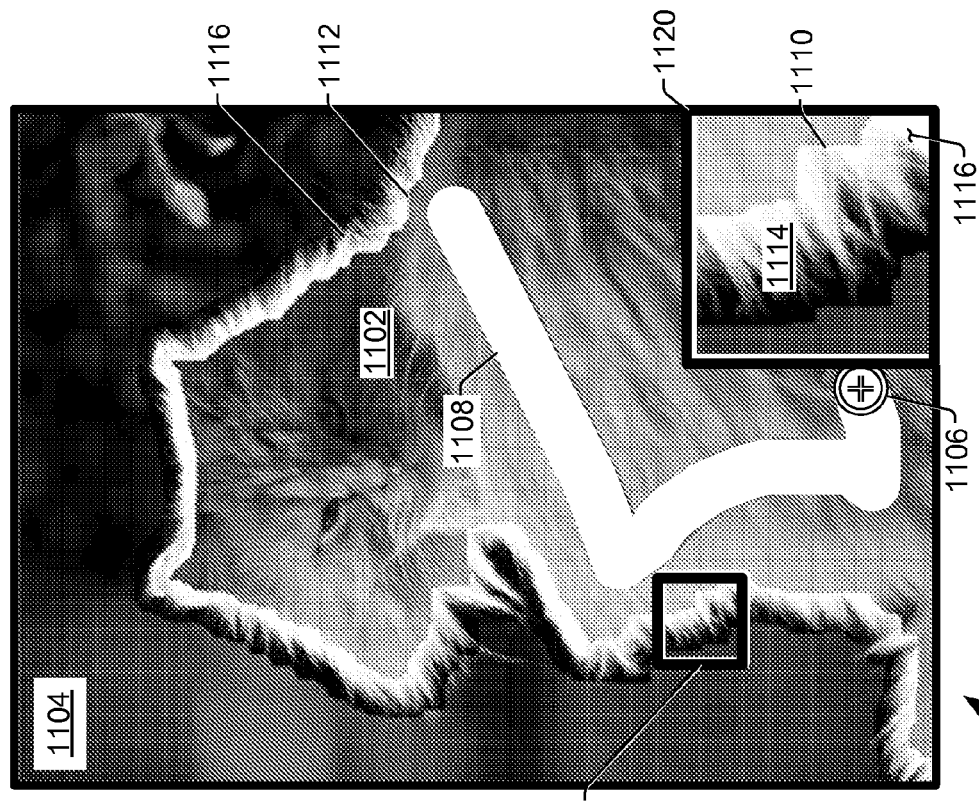
FIG. 11A-11D illustrate examples of a user interface and brush types for interactive image matting according to some implementations.
Figure 11A:
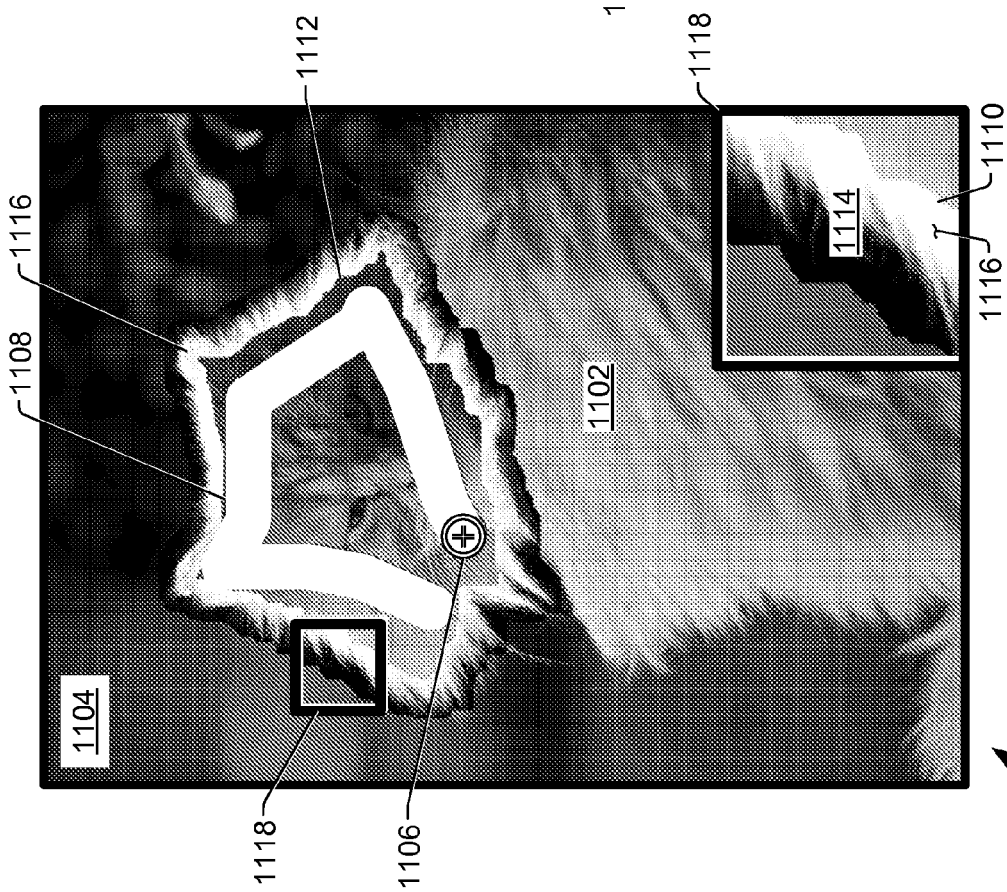

FIGS. 11A-11B depict an example of a user interface employing a selecting brush according to some implementations herein for interactively generating a trimap and a matte from an image. The selecting brush takes advantage of quick binary selection techniques to obtain an alpha matte in a fixed-width band along the object boundaries. For example, the selecting brush may be used to quickly identify the definite foreground portions of a foreground object, and thereby may be employed by a user to interactively generate a trimap. As illustrated in FIG. 11A, an image 1100 includes a cat as a foreground object 1102 on a background 1104. To select the foreground object 1102 for matting, the user may move a selecting brush 1106 over a portion of the object 1102 (e.g., while holding the left mouse button down). As the user moves the selecting brush 1106, a travel path 1108 of the selecting brush is typically not displayed, or may be temporarily displayed over the object 1102. Thus, the travel path 1108 is displayed here for discussion purposes.

Additionally, as the user moves the selecting brush 1106 over an area or portion of the object, the foreground region is automatically expanded by a binary selection algorithm, thereby generating a fixed-width band 1110 around a border of an expanded area 1112. The fixed-width band 1110 is automatically generated to serve as the unknown region 1114 of a corresponding trimap. Based on this, the image matting component then computes the alpha matte in the unknown region 1114. The corresponding alpha matte 1116 is displayed in real time (typically less than 0.2 seconds) in the fixed-width band 1110. Box 1118 in FIG. 11A depicts an enlarged portion of the image 1100 illustrating the fixed-width band 1110, the unknown region 1114 and the corresponding alpha matte 1116 generated in the unknown region 1114. The alpha matte 1116 may be generated by an image matting component, such as those described above, or as are additionally described below.

The selecting brush 1106 may incorporate a suitable binary selection algorithm, such as that described by Liu et al. in "Paint Selection," SIGGRAPH, 2009, although other suitable algorithms may also be employed. The Paint Selection algorithm is a binary selection algorithm which can quickly produce a binary selection (for typical 20 megapixel images, the feedback time is less than 0.1 seconds). Since the Paint Selection algorithm only expands the selection incrementally as the user selects a portion of the image, implementations herein may only compute the matte of the newly emerged boundary, which is often a fraction of the entire object boundary. For example, the Paint Selection algorithm incorporates progressive selection such that, given an existing selection F and a current brush C, a progressive selection algorithm computes a new selection F' on a background B. Once the new selection F' is obtained, the existing selection is updated as F=F∪F' for the next user interaction. In each triggered optimization, the Paint Selection algorithm first estimates the foreground color information. The intersection between the selection of the current brush C and the background B are denoted as seed pixels S where (S=C∩B). Using both seed pixels and local foreground pixels, the Paint Selection algorithm builds a local foreground color model $p^f$ by fitting a Gaussian Mixture Model (GMM) with four components. Using the local foreground pixels makes the estimation more stable because the brush or seed pixel region may be very small. Then, a background color model is updated. At the beginning of the user interaction, a background color model $p^b$ (a GMM with eight components) is initialized by randomly sampling a number (e.g., 1,200) of pixels from the background. In each subsequent user interaction, the Paint Selection algorithm replaces the samples that were labeled as foreground in the previous interaction with the same number of pixels randomly sampled from the background, and the background GMM is re-estimated using the updated samples. Consequently, the Paint Selection algorithm identifies and distinguishes selected portions of a foreground object from a background based on statistically determined color similarities and differences.

FIG. 11B illustrates an example of selection of additional portions of the foreground object 1102, thereby increasing the expanded area 1112 to encompass and select the entire foreground object 1102. Box 1120 in FIG. 11A depicts an enlarged portion illustrating the fixed-width band 1110, the unknown region 1114 and the corresponding alpha matte 1116 generated in the unknown region 1114 following selection of the additional areas of the foreground object 1102 using the selecting brush 1106.

As mentioned above, implementations herein provide a fixed-width band 1110 as an unknown region 1114 between an identified foreground region (i.e., the expanded area 1112) and the background 1104. According to some implementations, the user may adjust or specify the width of the band 1114 to match the width of any fuzzy or complex regions of a particular object. Because implementations herein are able to provide nearly instant feedback, a good width of the band 1114 can be typically be obtained in one or two tries. Consequently, the selecting brush according to implementations herein frees the user from having to tediously trace the object boundary and provides a region-based user interface that enables a user to quickly select and expand regions of a desired object with a few brush strokes.

Matting Brush

For many types of objects, a fixed-width band may be insufficient to cover wide complex or fuzzy regions. For those regions, typically after using the selecting brush to establish an initial unknown region or boundary, the user may switch to using a second type of tool referred to herein as the matting brush to modify the unknown region and improve the image matting result. The matting brush may function as a tool that the user employs to directly paint or select the unknown region of a trimap. For each movement of the matting brush, such as while pressing and holding the left mouse button, the matting component computes the alpha matte within and near the newly selected unknown area in real time and provides visual feedback to the user. Further, in some implementations, as discussed additionally below, the matting component may also compute the new composition. Both the alpha matte and the new composition are instantly updated so that the user can immediately know where to brush next.

Figures 11C, 11D:
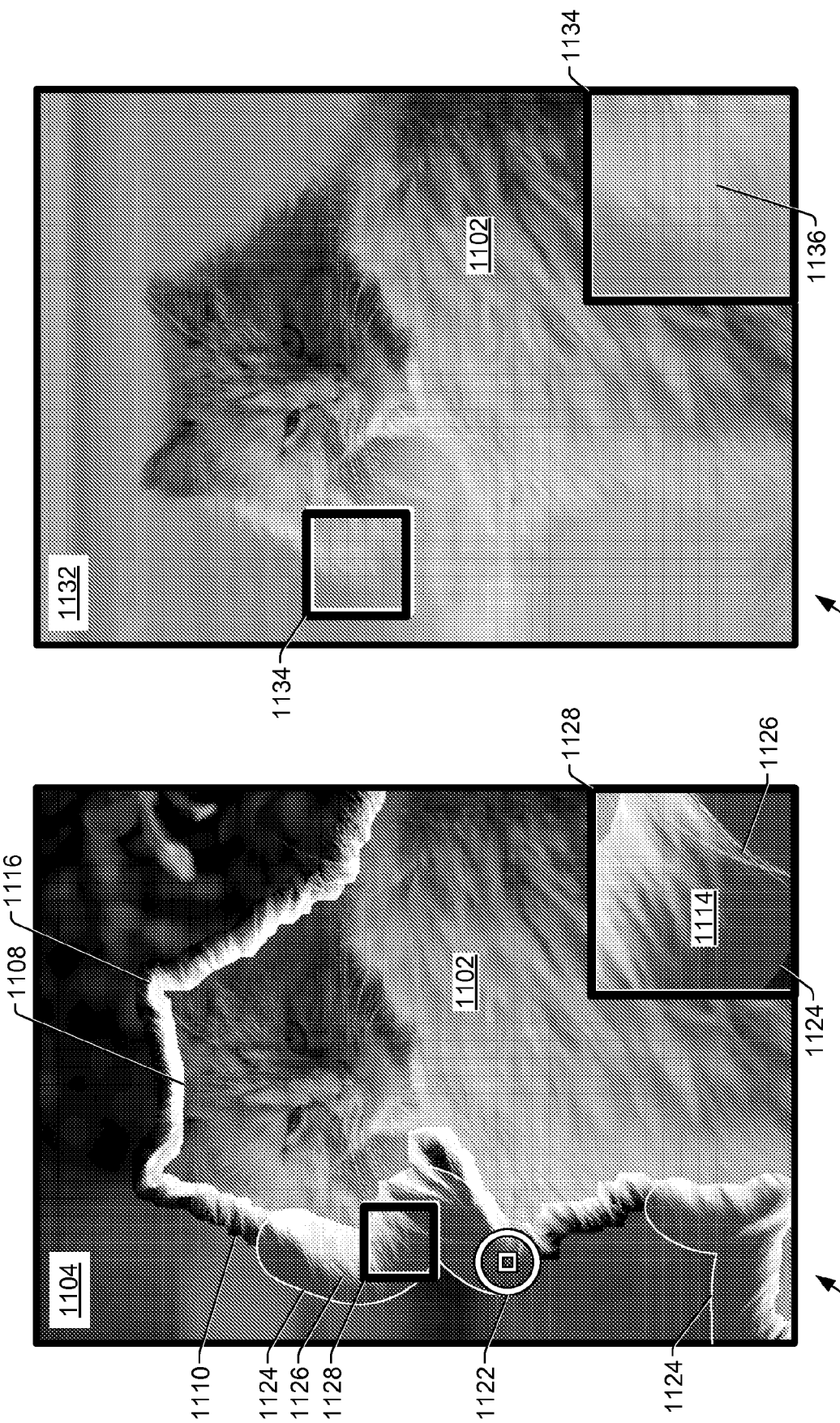

FIG. 11C depicts an example of a matting brush 1122 employed to expand the fixed-width band 1110 of the unknown region 1114 in certain areas of the image 1100. For example, at locations where the hair of the cat of image 1100 extends beyond the fixed-width band and into the background 1104, the user can employ the matting brush 1122 to expand the band 1110 and thereby add selected portions of the background to the unknown region 1114 of the trimap being generated through the interaction. Thus, additional portions of the object 1102 that extend into the background can be manually added to the unknown region using the matting brush 1122 and included in the resulting matte.

The brush sizes of the matting brush 1122 and the selecting brush 1106 may be adjusted by various techniques, such as by using the scroll wheel of the mouse to increase or decrease the size of a selected brush. For instance, as the user moves the matting brush 1122 along the band 1110, the band 1110 may increased in width corresponding to the brush size, as shown by the enlarged band areas 1124 in FIG. 11C, to include additional features of the object 1102 within the enlarge band areas 1124. Further, the alpha matte 1126 in the enlarged band areas 1124 may be immediately computed and displayed in white as feedback to the user as the user is moving the matting brush 1122 over that portion of the image 1100. Box 1128 in FIG. 11C depicts an enlarged portion of the image 1100 illustrating the enlarged band area 1124, the unknown region 1114 and the corresponding alpha matte 1126 generated in the unknown region 1114. Accordingly, the user may use the matting brush 1122 to ensure that additional complex, hairy or fuzzy portions of the object 1102 are included in the alpha matte created for the object.

FIG. 11D depicts an example composite image 1130 in which the foreground object 1102 has been pulled from the original background 1104 and composited with a new background 1132. Box 1134 in FIG. 11D shows an enlarged portion of the image 1130 illustrating hair details 1136 of the foreground object 1102 that have been captured using the multiple brush types described above.

Position-Aware Brush Switching.

In some implementations, when switching brush types, the user may manually select one of the brush types by clicking some buttons or pressing keyboard shortcuts. This process of manually switching between brush types may easily distract the user from a region of interest on the image. To address this, implementations herein may include a position-aware brush switching mechanism, whereby the type of the brush is automatically determined by the position of the cursor of the input device in the current image/trimap.

Figure 12A:
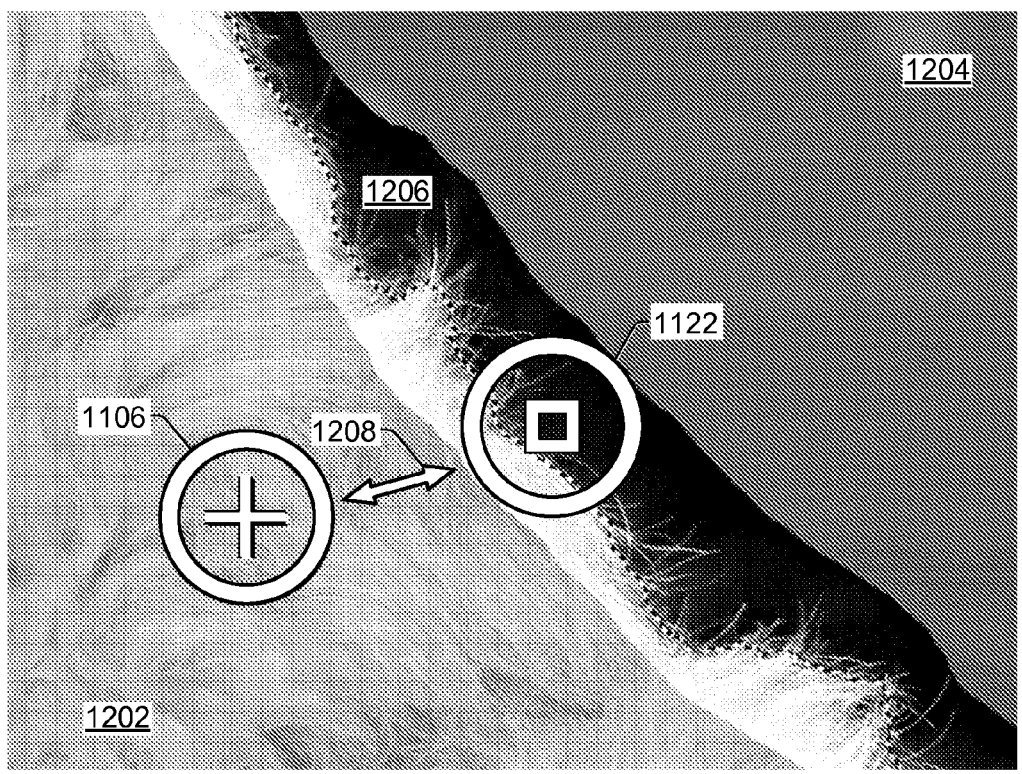
FIGS. 12A-12B illustrate an automatic brush selection mechanism for interactive image matting according to some implementations.
Figure 12B:
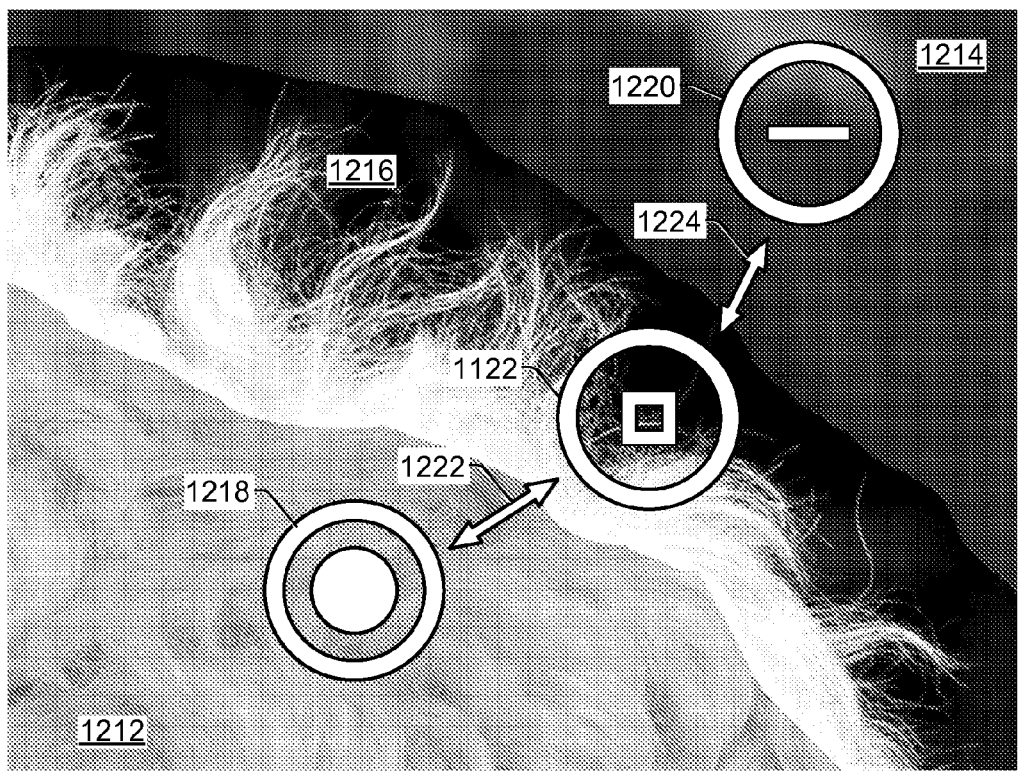

FIGS. 12A-12B illustrate examples of position-aware brush switching. An image 1200 includes a foreground 1202 and a background 1204, with a boundary or unknown region 1206 in between the foreground region and background region. As illustrated in FIG. 12A, a user may start with a selecting brush 1106 to select and expand a portion of foreground 1202 for generating a matte. To paint or select a certain type of region, the user may merely start moving the brush (e.g., while pressing the left mouse button) over the region and dragging the brush (input device cursor). When the cursor is located over the foreground 1202, the brush assumes the shape of the selecting brush 1106. When the user moves the selecting brush 1106 from the foreground 1202 to the unknown region 1206, as indicated by arrow 1208, the brush automatically changes configuration from the selecting brush 1106 to the matting brush 1122. When the brush has changed configuration, the user may increase or decrease the size of the brush and again press and hold the left mouse key to move the matting brush 1122, such as for enlarging the unknown region 1206 and thereby encompassing into the alpha matte any additional portions of the foreground that still extend into the background 1204. Such seamless automatic switching between the selecting brush 1106 and the matting brush 1122 enables the user to stay focused on the image without shifting attention to other parts of the user interface.

For many images, it is sufficient to have the selecting brush 1106 and the matting brush 1122 to use to identify the foreground object and creating the matte. However, in other implementations, such as where complex images are involved, it is useful to have two additional brushes, as illustrated in FIG. 12B. FIG. 12B includes an image 1210 having a foreground 1212 and a background 1214, with an unknown region 1216 in between. A foreground identification brush 1218 may be provided for positively identifying specific portions of the foreground object 1212, such as by holding the left mouse button down and moving the foreground identification brush 1218 over portions of the unknown region 1216. This will result in those portions changing from the alpha matte white to the color of the known foreground 1212. Furthermore a background identification brush 1220 may be provided for positively identifying portions of the background or other portions of the image that are not desired to be included in the alpha matte and extracted foreground. Thus, the background identification brush 1220 may be used to exclude part of the foreground or other portions of the image from being included in the matte. Consequently, the user can choose one of three matting brush types (foreground, background, and unknown) to modify the trimap that is automatically created by the selecting brush 1106, and the size of each brush can be adjusted by scrolling the mouse wheel. Further, as discussed above, the brushes may seamlessly switch from one to the next as the mouse cursor is moved from the foreground region to the unknown region to the background region and back, as indicated by arrows 1222, 1224. For example, as the cursor of the mouse or other input device rolls over a particular region (i.e., foreground, unknown, or background) without the left mouse button pressed, the brush will change to the configuration of the brush corresponding to that region. When the brush has assumed a particular configuration, the user may press the left mouse button to activate the brush for carrying out the functions described above.

Framework for Interactive Image Matting

Figure 13:
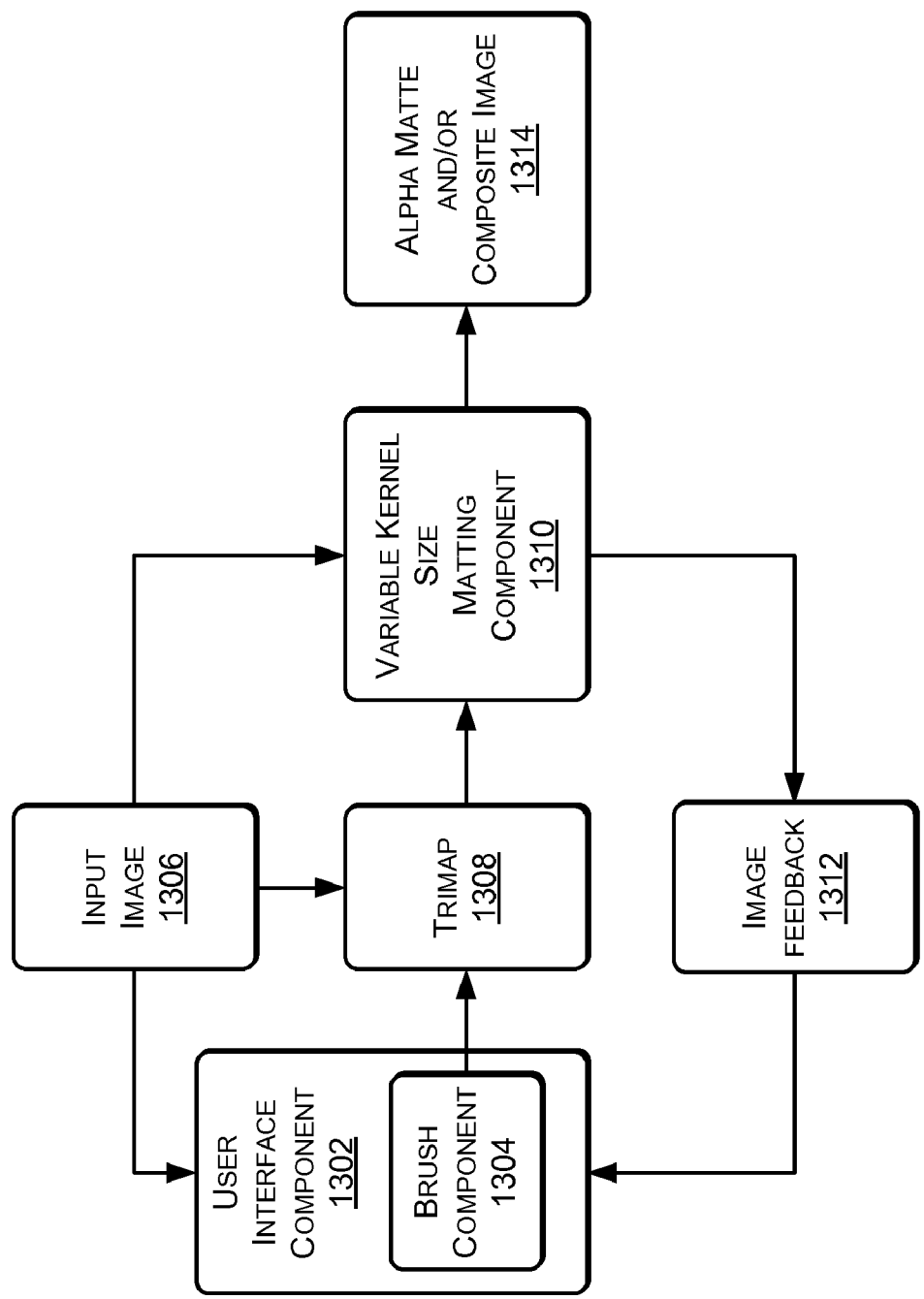
FIG. 13 is a block diagram of a framework for interactive image matting according to some implementations.

FIG. 13 is a block diagram of an example of a framework 1300 for interactive image matting according to some implementations herein. Framework 1300 includes a user interface component 1302 having a brush component 1304. As described above, the user interface component 1302 may display an input image 1306 to a user. The user may use the brush component 1304 to interact with the input image 1306 for generating a trimap 1308. For example, as discussed above, the user may use the selecting brush 1106 to select a foreground region and the user interface component automatically identifies an unknown region adjacent to the selected foreground region. A variable kernel size matting component 1310 performs matting processing on the unknown region of the trimap 1308 for identifying the matte portion contained therein, and provides this information along with the trimap information as visual image feedback 1312 to the user interface component 1302. A user may then further refine the trimap 1308 using the brush component 1304, such as by using the matting brush(es) discussed above, and receive additional image feedback. The user may perform any desired number of refinements before outputting the final alpha matte or composite image. Further, in some implementations, instead of displaying the alpha matte and the original background during the interactive image matting processing, the image feedback 1312 may include a display of the new background to which the selected foreground object is being transferred.

The variable kernel size matting component 1310 may correspond to either of the matting components 206, 610, discussed above, the additional variations in the matting component discussed below, or any combination thereof. For example, as discussed above, some implementations herein perform matting processing based on the assumption that the foreground colors lie in a single line in the local window, with the same being true for the background. As a larger window is used, more samples are collected and the color lines are prevented from becoming too locally determined. This is generally beneficial for high resolution images or for hairy, fuzzy or complex regions. Additionally, a larger window also includes more pixels and more distant pixels in the boundary conditions, thereby increasing the accuracy of the result when some of the marked known pixels are erroneous, which may sometimes occur when an interactive process is used.

Process for Interactive Image Matting

Figure 14:
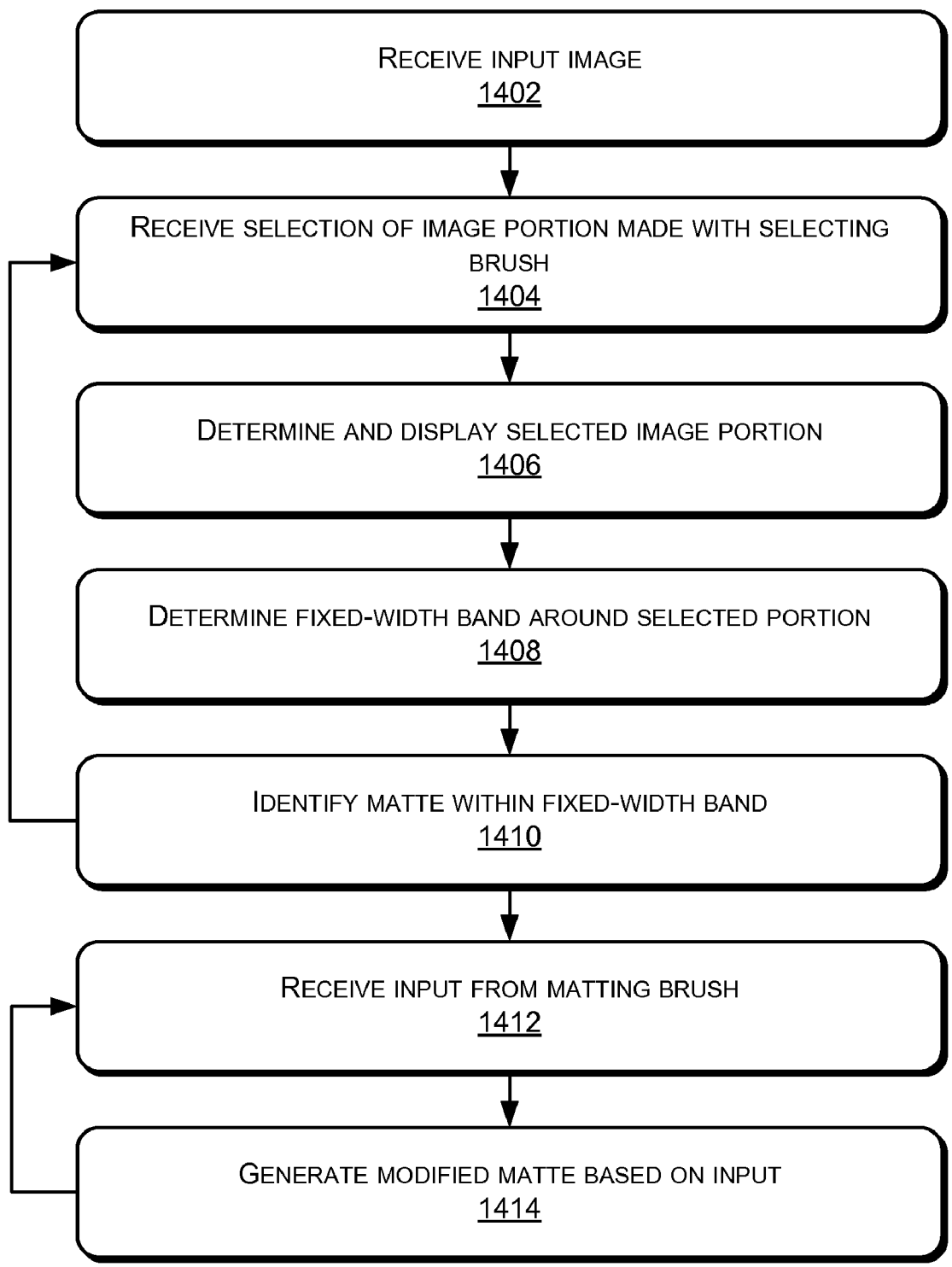
FIG. 14 is a flow diagram of an example process for interactive image matting according to some implementations.

FIG. 14 is a flow diagram of an example of an interactive matting process 1400 according to some implementations herein. In the flow diagram, the operations are summarized in individual blocks. The operations may be performed in hardware, or as processor-executable instructions (software or firmware) that may be executed by one or more processors. Further, the process 1400 may, but need not necessarily, be implemented using the framework of FIG. 13.

At block 1402, an input image is received for processing. For example, in some implementations, a high-resolution image having a foreground object on a natural background is received for pulling the foreground object and an alpha matte from the background of the image. The received image may be displayed in a user interface, such as on a display device, or the like.

At block 1404, a selection of an image portion of the image made with a selecting brush is received. For example, as discussed above, the user may use an interactive tool referred to as a selecting brush for making one or more strokes on the image to identify a portion of the image for matting processing. Accordingly, the user may use the selecting brush to make one or more brush strokes on the portion of the image that the user desires to pull from the image. Alternatively, in other implementations, the selecting brush might be configured to select background portions of the image, rather than foreground portions.

At block 1406, based upon the received input from the selecting brush, a foreground portion of the image is determined. For example, based upon the one or more brush strokes a binary selection algorithm may expand an area over the selected portion of the image in real time as feedback to the user indicating the selection of the portion of the image.

At block 1408, a fixed-width band is determined and displayed around the selected portion of the image as an unknown region. For example, a fixed-width band may have a default width or a width that is specified by the user. Further, the user may adjust the specified width of the band depending on the object or image portion being matted.

At block 1410, the alpha matte within the fixed-width band is determined by the matting component. For example, the selected portion of the image serves as a known foreground region, while the unselected portion of the image serves as a background region, and the fixed-width band serves as an unknown region, thereby forming a trimap of the image. The matting processing may be performed on the image using the trimap in the manner described above or using the additional variations described below. The identified matte in the unknown region may be displayed in real-time to the user in the user interface. Furthermore, if there are additional definite foreground portions of the image to be added to the identified portion, the user may continue to use the selecting brush to select these additional portions, such as for selecting an entire foreground object. Consequently, blocks 1404 through 1410 may be repeated several times.

At block 1412, input from a matting brush may be received. For example, the user may examine the matte produced by the selecting brush and the extent of the unknown region to determine whether there are additional parts of the selected image portion that are desired to be included, but are not currently included, in the displayed matte. If there are such additional parts, the user may activate the matting brush to expand the unknown region to encompass the additional parts into the unknown region. Further, in the case of some types of images, the user may wish to use a foreground matting brush that identifies some unknown or background portions as part of the foreground and/or a background matting brush that identifies some unknown or foreground portions as part of the background for purposes of the alpha matte.

At block 1414, a modified matte is generated based on the input received from the matting brush. For example, by expanding the unknown region, the user creates a modified trimap which can then be processed in real time and displayed on the user interface. The user may continue to use the matting brush to further refine the matte and/or may use additional matting brushes such as the foreground matting brush and/or the background matting brush on complicated images. Consequently, blocks 1412 and 1414 may be repeated a number of times until a satisfactory matte is produced. Further, the process need not necessarily be executed in the order of this example. For instance, the user may use the matting brush before the selecting brush, the user switch between the matting brush and the selecting brush at any time, and so forth.

Updates in Response to Brush Inputs

Some implementations herein may compute the matte in the unknown region indicated by the matting or selecting brush incrementally, i.e., only a small portion of the image is updated near the most recently painted region of the image. Consequently, the impact of the newly marked or selected region seldom reaches very far in most cases. Therefore, implementations herein may typically simply expand the selected region to obtain the updated region, and a large part of the alpha matte might not be updated. For example, with respect to the selecting brush, some implementations may extend the newly expanded band (e.g., by 3 times the bandwidth) on two sides to cover the existing unknown pixels. The update region may be the union of the existing band and the two extended sections. Furthermore, with respect to the matting brush, some implementations may expand the newly marked region by 3 times the brush radius, and the updated region is the intersection of the expanded region and all the unknown pixels. Experiments have shown that the above simple strategy is sufficient to achieve satisfactory quality, although other strategies may also be applied, and implementations herein are not limited to this particular example. Once the update region is determined, implementations herein may solve the alpha matte only for the unknown pixels inside the update region. The alpha values outside the update region may be considered as boundary conditions. Further, the kernel size selected by the matting component may correspond to the brush size used in selecting the unknown region, i.e., the larger the brush size, the larger the kernel size.

Localized Integral Images

As discussed above, some implementations herein use the Integral Image technique (see, e.g., Crow, F. C., "Summed-area tables for texture mapping," SIGGRAPH, 1984) to calculate the matting Laplacian matrix with a complexity that is independent of the window radius. This operation dominates the computational time in each iteration of the linear solver in the matting component (e.g., the CG solver). However, the Integral Image technique calculates the integral image in a rectangular area, which is the bounding box of the pixels of interest (e.g., corresponding to the update region and the associated boundary conditions). Unfortunately, these pixels often occupy only a small portion in the bounding box. Therefore for the interactive image matting implementations herein, computing the entire integral image for an update can lead to a high degree of redundancy. To address this, some implementations herein utilize a localized integral images processing technique.

Figure 15:
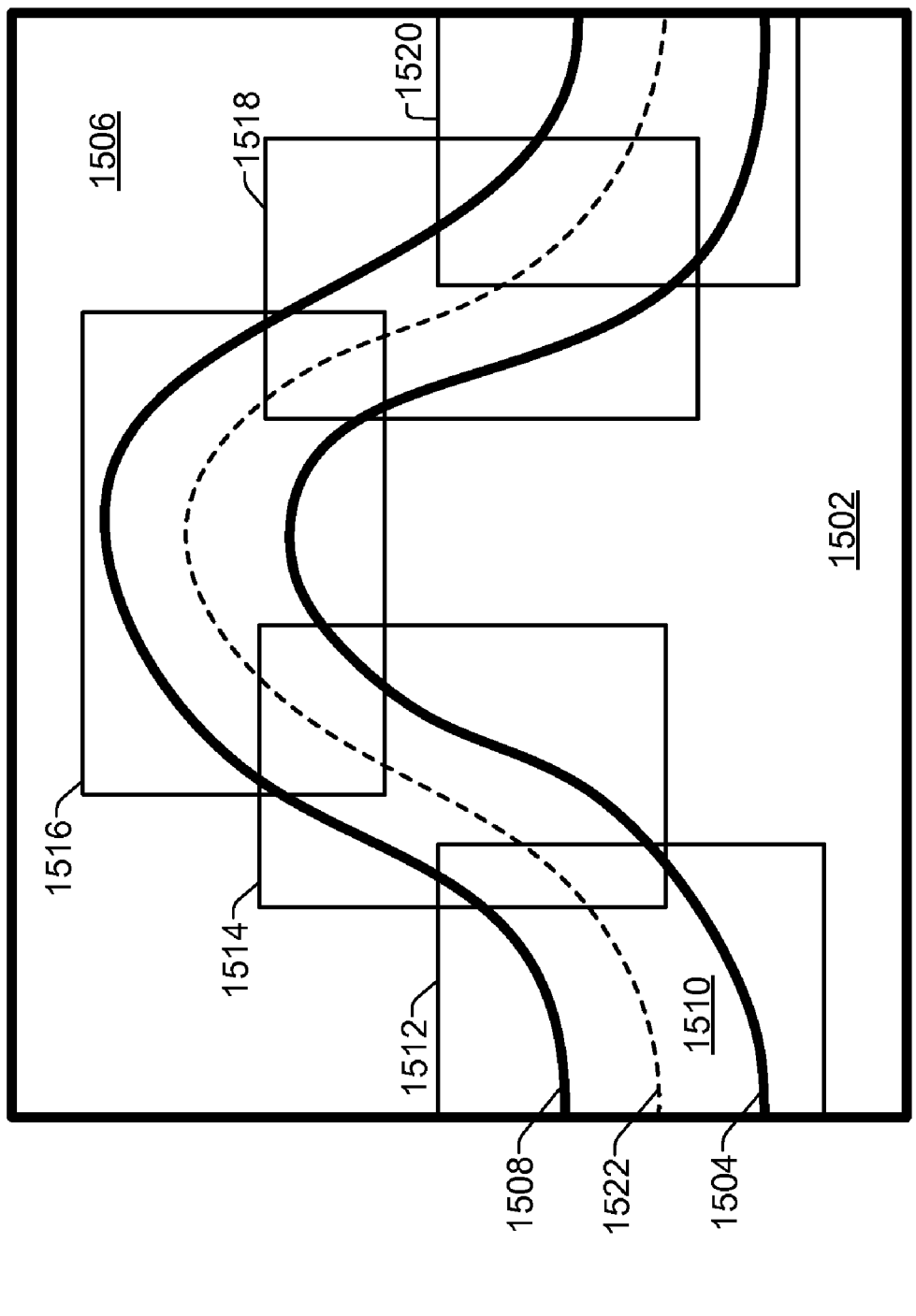
FIG. 15 illustrates an example of localized integral image processing according to some implementations.

FIG. 15 is an example image 1500 for illustrating localized integral image processing. Image 1500 includes a foreground region 1502 bounded by a foreground boarder 1504, and a background region 1506, bounded by a background boarder 1508. Thus, an unknown region 1510 exists between the foreground boarder 1504 and the background boarder 1508. For example, suppose that the selecting brush had just been used to select the foreground region 1502, thereby establishing a new position for the unknown region 1510 based on a fixed-width band, as described above. In order to determine the alpha matte for the updated region, implementations herein may cover all the pixels of interest in the unknown region 1510 with a series of small localized rectangles 1512, 1514, 1516, 1518, 1520. The integral image is only calculated inside each of these small rectangles 1512-1520. For example, each small rectangle 1512-1520 acts as a box filter on the corresponding portion of the image. Further, often the outcome near a small rectangle boundary may be erroneous since the outside pixels are omitted. Accordingly, some implementations herein may expand each small rectangle 1512-1520 by the window radius r in each dimension during matting processing, but only apply the outcome inside the original small rectangle 1512-1520.

To obtain the small rectangles, implementations herein first extract a skeleton curve 1522 of the unknown region 1510. In the case of a selecting brush update, the skeleton curve 1522 is the boundary of the binary selection. In the case of a matting brush update, the skeleton curve 1522 may be the mouse trace, i.e., the path followed by the mouse cursor while the matting brush is active. Implementations herein divide the skeleton curve 1522 into small segments, and cover each segment by a rectangle, as illustrated in FIG. 15. These rectangles 1512-1520 are then expanded in each dimension (by the radius of the kernel size) to cover all pixels of interest. Since the total area of the small rectangles is only slightly larger than the number of unknown pixels N, the time complexity in each iteration of the linear solver is reduced to O(N). The localized integral image processing herein is typically useful in the case of the selecting brush, where the newly selected region is often convex, and the band of the unknowns is relatively long, but can also be applied in the case of the matting brush, as mentioned above.

Adaptive Coarse-to-Fine Approximation

The variable kernel size matting processing introduced above may serve as an exact linear solver for the linear system. However, some implementations herein may employ a coarse-to-fine approximation processing scheme to approximate the result and further improve speed and efficiency. These implementations first sub-sample the color image, a map of the boundary conditions, and a map indicating known and unknown pixels (i.e., β and D in equation (7)) into a coarse resolution. The sub-sampling scale is denoted by S. Further, the image and the maps are sub-sampled directly without Gaussian blurring. Next, the linear system in equation (7) is solved at the coarse resolution. Then the linear coefficients (a, b) in equation (2) are calculated in the coarse resolution, and following this are bilinearly interpolated to a fine resolution. The alpha values are computed using equation (2) directly without any further optimization, under the guidance of the fine resolution color image.

Here, implementations may adaptively sub-sample the image according to the width w of the unknown band. In the case of the selecting brush, w is naturally the width of the band around the binary boundary. In the case of the matting brush, implementations may consider w as the brush diameter of the unknown region matting brush. The image is sub-sampled so that the bandwidth in the coarse resolution is a fixed number $w_0$. Accordingly, the sub-sampling scale is adaptively determined by: $S=w/w_0$. Some implementations herein by default set $w_0=24$ for the selecting brush, and $w_0=48$ for the matting brush. At the coarse resolution, the window radius r of the matting Laplacian is set as $r=w_0/6$. The benefit of the coarse-to-fine approximation is that the known alpha values propagate into the band quickly, and the linear solver often converges within 20 iterations. For example, suppose that the bandwidth of an unknown region is 300 pixels, and the matte is to be obtained by solving a large kernel matting Laplacian having a window radius of r=50. The adaptive coarse-to-fine result has been found to be essentially visually identical to the result obtained in processing at the full resolution.

The time complexity of matting processing when using coarse-to-fine approximation is not dependent on brush size. For example, if the length of the unknown band is equal to l at the fine resolution, the number of unknown pixels in the coarse resolution is $N_c \propto wl/S^2 = w_0^2 l/w$. For the linear solver, the time complexity per iteration is $O(N_c)$. As the number of iterations is often no more than 20, the whole running time of linear solver is generally proportional to $N_c$. Thus, the number of iterations is independent of the number of unknowns N at the fine resolution. Therefore, only the relative length of the unknown region (l/w) affects the running time. Consequently, by use of the adaptive coarse-to-fine scheme, implementations herein still enable users to obtain instant feedback, even when using a wide band or a large brush.

Foreground Estimation

For the new composition, some implementations herein efficiently estimate the foreground colors for high resolution images to more closely determine the true foreground color. According to these implementations, the matting Laplacian matrix is also applicable to solving for the foreground colors. Furthermore, this allows implementations herein to use large kernels and the adaptive coarse-to-fine scheme discussed above. Consequently, the foreground can be gracefully handled in the same framework as the alpha matte.

For estimating the foreground color, instead of computing F, these implementations consider Fα as the unknown variable. From the local affine model in equation (2) and the matting equation (1), Fα can be expressed by a local linear transform of I, as follows:

$$(F\alpha)_i = I_i - B_i(1 - \alpha_i) \quad (17)$$
$$= I_i - B_i(1 - a^T I_i - b)$$
$$= PI_i + q \quad \forall i \in \omega$$

Here $P=U+B_i a^T$ is a 3×3 matrix, and $q=B_i(b-1)$ is a 3×1 vector. Supposing a smooth B, then P and q can be considered as nearly constant in the local window. Equation (17) indicates that each channel of Fα is also a local affine transform of I, like the alpha in equation (7). Therefore, the variable size kernel matting and the adaptive coarse-to-fine scheme can also be directly applied when calculating Fα.

Figure 16A:
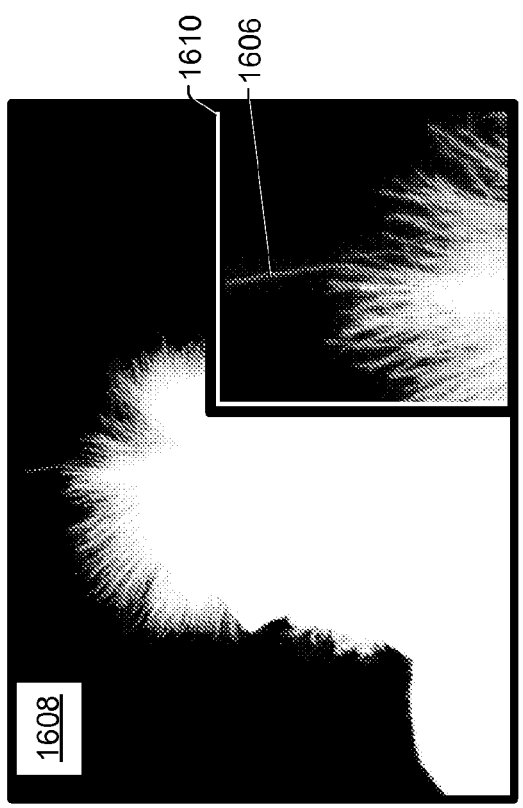
FIGS. 16A-16D illustrates an example of variable-kernel-size based foreground estimation according to some implementations.
Figure 16B:
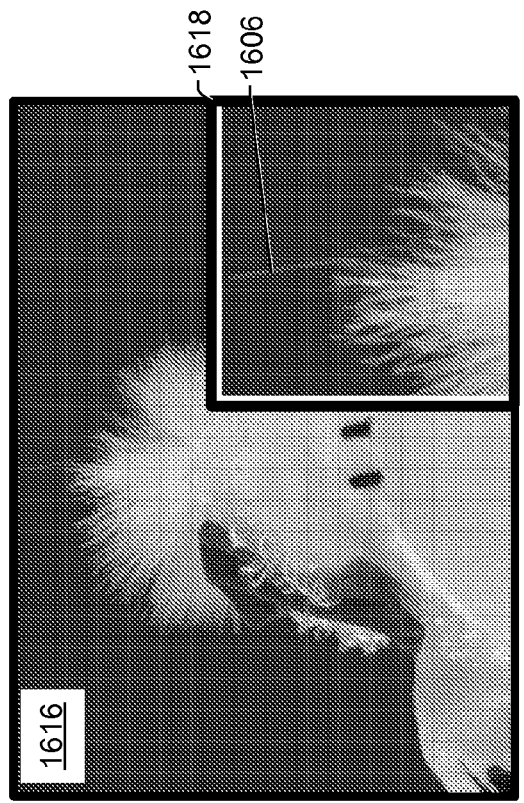
Figure 16C:
Figure 16D:
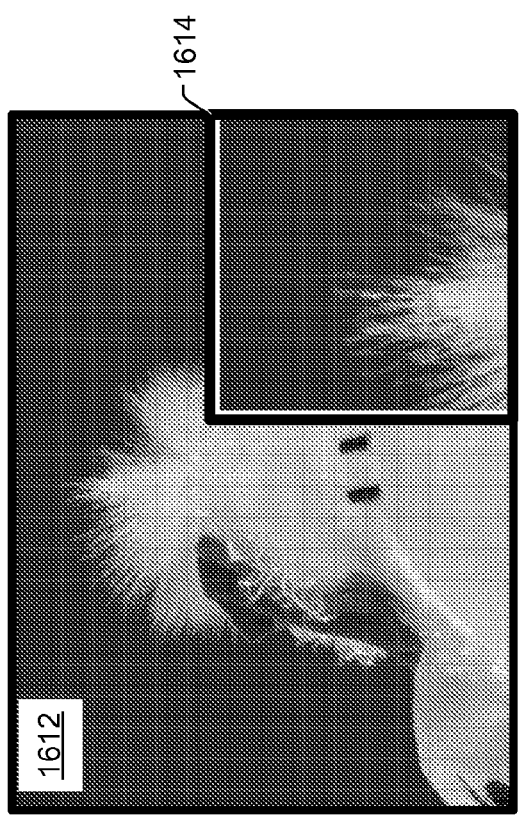

FIGS. 16A-16D provide an example of variable-kernel-size based foreground estimation. FIG. 16A depicts an image 1600 of a toy having hair extending into a natural background. Box 1602 is an enlargement of an area covered by box 1604 showing details of a hair 1606 extending into the background. FIG. 16B depicts an alpha matte 1608 corresponding to the image of 1600 obtained according implementations herein, as discussed above. Box 1610 is enlargement of the alpha matte in the area corresponding to box 1604 of FIG. 16A showing that hair 1606 is included in the alpha matte 1608. FIG. 16C depicts a composite image 1612 obtained by multiplying the input image with the alpha matte 1608 to form the composite image 1612 on a red background. As shown in enlarged box 1614, corresponding to in the area corresponding to box 1604 of FIG. 16A, despite the quality matte 1608, some color bleeding has occurred in the composite image 1612 making the hair 1606 difficult to distinguish. On the other hand, FIG. 16D depicts a composite image 1616 generated by solving for the estimated foreground color Fα. In the enlarged box 1618, the hair 1606 is clearly discernable. One additional advantage of solving Fα using the technique is that α is not necessarily solved beforehand. Consequently, implementations herein are able to solve for a and the three foreground color channels of F in parallel, thereby taking advantage of modern multi-core machines and parallel thread processing.

Framework for Interactive Image Matting with Additional Processing

Figure 17:
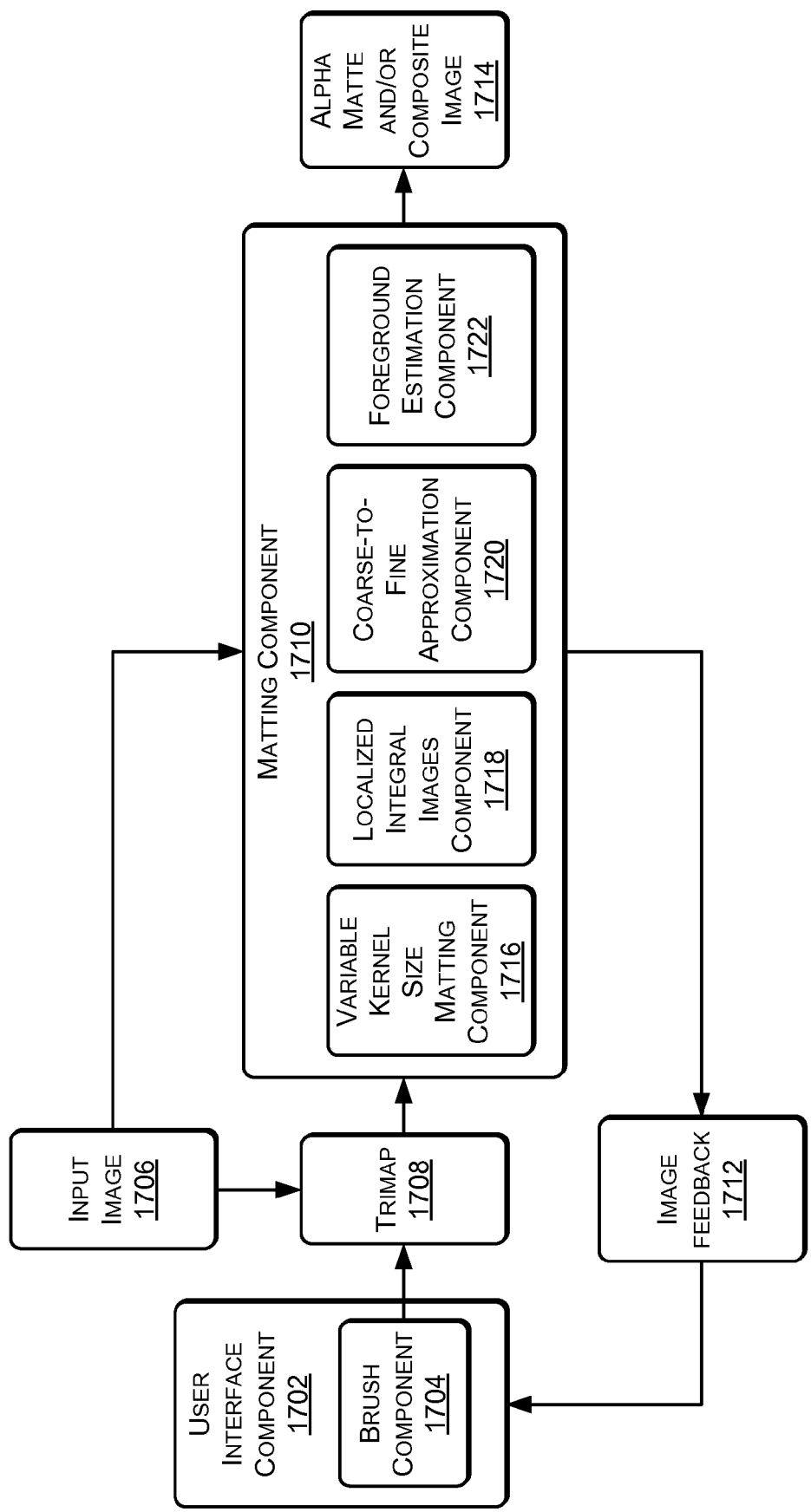
FIG. 17 is a block diagram of a framework for interactive image matting with localized integral image processing, coarse-to-fine approximation, and/or foreground estimation according to some implementations.

FIG. 17 is a block diagram of an example of a framework 1700 for interactive image matting with localized integral image processing, coarse to fine approximation, and/or foreground estimation according to some implementations herein. Framework 1700 includes a user interface component 1702 having a brush component 1704. As described above, the user interface component 1702 may display an input image 1706 to a user. The user may use the brush component 1704 to interact with the input image 1706 for generating a trimap 1708. For example, as discussed above, the user may use the selecting brush 1106 to select a foreground object and the user interface component 1702 automatically identifies an unknown region adjacent to the selected foreground object. A matting component 1710 performs matting processing on the unknown region of the trimap 1708 for identifying the matte portion contained therein, and provides this information along with the trimap information as image feedback 1712 to the user interface component 1702. Based on the visual feedback, a user may then further refine the trimap 1708 using the brush component 1704, such as by using the matting brush (es) discussed above, and receive additional image feedback in response to the refinements. The user may perform any desired number of refinements before outputting the final alpha matte or composite image 1714. Further, in some implementations, instead of displaying the alpha matte and the original background during the interactive image matting processing, the image feedback 1712 may include a display of the new background to which the selected foreground object is being transferred, or other variations.

The matting component 1710 may include a variable kernel size matting component 1716 that may correspond to any of variable kernel size matting components 206, 610, 1310 discussed above. Further, matting component 1710 may also include a localized integral images component 1718 for carrying out localized integral image processing, as described above, such as in response to interactive updates to the trimap 1708. Matting component 1710 may also include a coarse-to-fine approximation component 1720 for implementing adaptive coarse-to-fine approximation, as discussed above. For example, when a large kernel size is to be used, a coarse approximation may be employed based on sub-samples of the image, a map of boundary conditions and a map of known and unknown pixels. The coarse-to-fine approximation component sub-samples the image into a coarse resolution used to solve the unknown area, and subsequently performs bilinear interpolation to generate the alpha matte at a finer resolution based on a resolution of the image. Matting component 1710 may further include a foreground estimation component 1722 for efficiently estimating foreground colors and to enable use of the above-mentioned coarse-to-fine scheme. Some or all of these components 1718, 1720 and 1722 may be used in addition to or in place of the other matting processing components discussed above, such as with respect to FIGS. 2, 6 and 13.

Process for Interactive Image Matting

Figure 18:
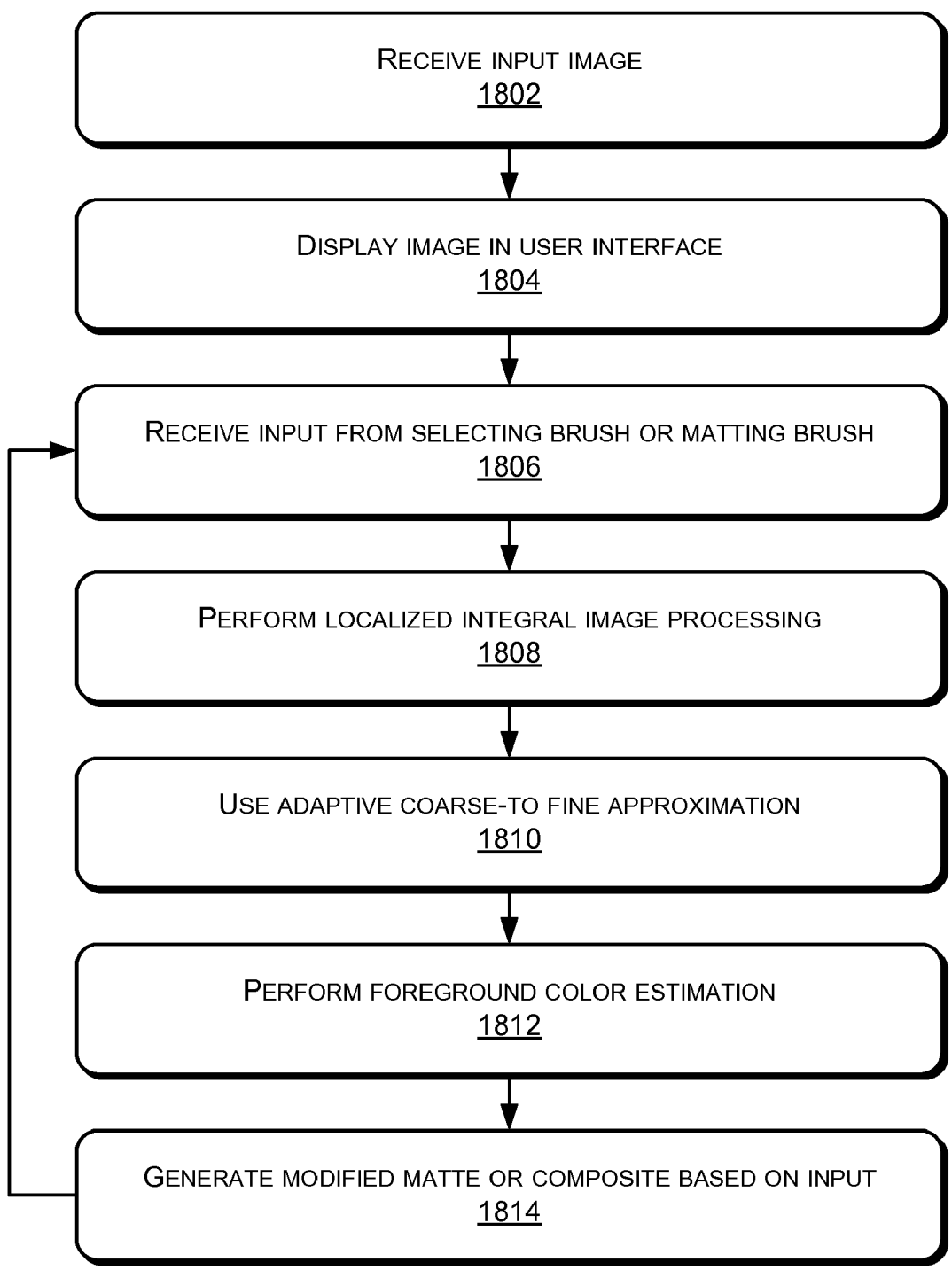
FIG. 18 is a flow diagram of an example process for interactive image matting with localized integral image processing, coarse-to-fine approximation, and/or foreground estimation according to some implementations.

FIG. 18 is a flow diagram of an example of an interactive matting process 1800 with localized integral image processing, coarse to fine approximation, and/or foreground estimation according to some implementations herein. In the flow diagram, the operations are summarized in individual blocks. The operations may be performed in hardware, or as processor-executable instructions (software or firmware) that may be executed by one or more processors. Further, the process 1800 may, but need not necessarily, be implemented using the framework of FIG. 17.

At block 1802, an input image is received for processing. For example, in some implementations, a high-resolution image having a foreground object on a natural background is received, such as for pulling the foreground object and an alpha matte from the background of the image.

At block 1804, the received image may be displayed in a user interface, such as on a display device, or the like, to enable a user to interact with the image.

At block 1806, an input is received from the selecting brush or the matting brush. For example, as discussed above, the user may use an interactive tool referred to as the selecting brush for making one or more strokes on the image to identify a portion of the image for matting processing. Further, the user may use the matting brush for identifying and adding portions of the image to an unknown region.

At block 1808, in some implementations, localized image processing may be performed on the unknown region resulting from the input received from the selecting brush or the matting brush. For example, a plurality of small rectangles that overlap each other and that together encompass the unknown region may be processed by the matting component to identify the alpha matte.

At block 1810, in some implementations, adaptive coarse-to-fine processing may be performed. For example, a coarse processing based on sub-samples of the image, the map of the boundary conditions, and the map of the known and unknown pixels may be used to approximate the linear system at a coarse resolution. The coarse resolution can be used to more quickly solve the unknown area, and bilinear interpolation can then be use to generate the alpha matte at a finer resolution based on a resolution of the image At block 1812, when the foreground object is to be transferred to a new background, in some implementations, foreground estimation may be used in which the foreground colors F and the alpha matte $\alpha$ are calculated together based on the matting Laplacian matrix.

At block 1814, a matte or composite image is generated based on the input received from the brush using one or more of the foregoing. The user may continue to use the selecting brush or the matting brush to further refine the matte and/or may use additional matting brushes such as the foreground matting brush and/or the background matting brush on complicated images. Consequently, blocks 1806-1814 may be repeated a number of times until a satisfactory matte is produced. Further, the blocks need not necessarily be carried out in the order of this example, but may be performed in any suitable order.

Computing System Environment

Figure 19:
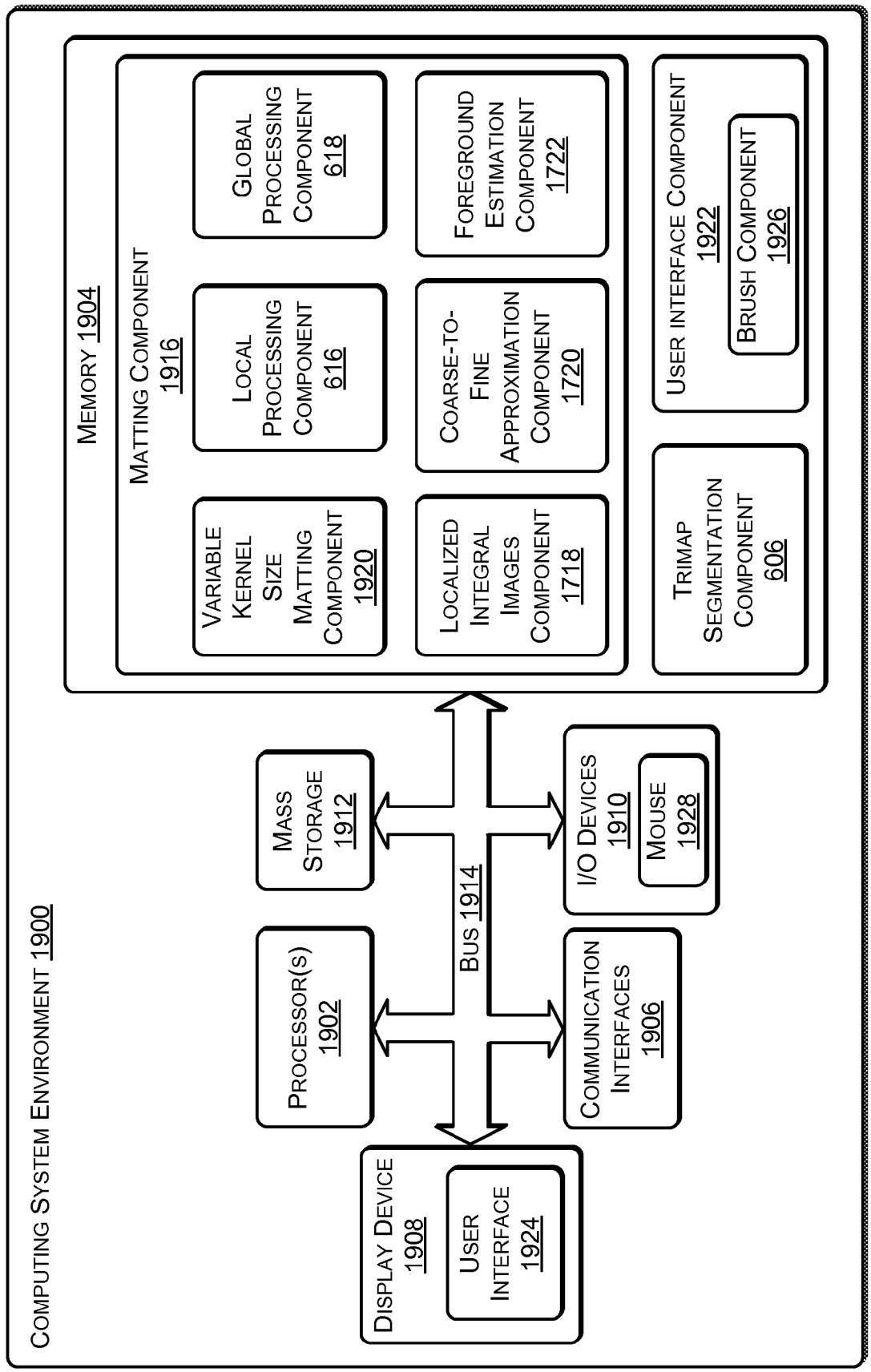
FIG. 19 is a block diagram of an example of a suitable computing system environment according to some implementations.

FIG. 19 illustrates an example configuration of a suitable computing system environment 1900 according to some implementations herein. The computing system environment 1900 may include at least one processor 1902, a memory 1904, communication interfaces 1906, a display device 1908, input/output (I/O) devices 1910, and one or more mass storage devices 1912, all able to communicate through a system bus 1914 or other suitable connection.

The processor 1902 may be a single processing unit or a number of processing units, all of which may include single or multiple computing units or multiple cores. The processor 1902 can be implemented as one or more microprocessors, microcomputers, microcontrollers, digital signal processors, central processing units, state machines, logic circuitries, and/or any devices that manipulate signals based on operational instructions. Among other capabilities, the processor 1902 can be configured to fetch and execute computer-readable instructions or processor-accessible instructions stored in the memory 1904, mass storage devices 1912, or other computer-readable storage media.

Memory 1904 and mass storage devices 1912 are examples of computer-readable storage media for storing instructions which are executed by the processor 1902 to perform the various functions described above. For example, memory 1904 may generally include both volatile memory and nonvolatile memory (e.g., RAM, ROM, or the like). Further, mass storage devices 1912 may generally include hard disk drives, solid-state drives, removable media, including external and removable drives, memory cards, Flash memory, floppy disks, optical disks (e.g., CD, DVD), storage arrays, storage area networks, network attached storage, or the like, or any combination thereof. Both memory 1904 and mass storage devices 1912 may be collectively referred to as memory or computer-readable storage media herein. Memory 1904 is capable of storing computer-readable, processor-executable program instructions as computer program code that can be executed on the processor 1902 as a particular machine configured for carrying out the operations and functions described in the implementations herein.

Memory 1904 may include the trimap segmentation component 606 and a matting component 1916 which can be executed on the processor 1902 for implementing the functions described herein. Matting component 1916 may correspond to any of matting components 206, 610, 1310 and 1710. Matting component 1916 may include a variable kernel size matting component 1918, corresponding to any of variable kernel size matting components 206, 614, 1310 and 1716. Matting component 1916 may further include in some implementations the local processing component 616 and the global processing component 618. Additionally, in some implementations, matting component 1916 may include the localized integral images component 1718, the coarse-to-fine approximation component, and the foreground estimation component 1722. In some implementations, memory 1904 may also include a user interface component 1922 for generating a user interface 1924 on display device 1908. User interface component 1922 may enable a user to interactively use matting component 1916 for pulling a matte from an image. In some implementations, user interface component 1922 may correspond to either of user interface components 1302, 1702, and may include a brush component 1926 corresponding to either of brush components 1304, 1704. For example, the user may use a mouse 1928 or other input device 1910 to interact with an image such as by using one or more brushes for generating a trimap of the image being processed. In some implementations, matting component 1916, user interface component 1922 and trimap segmentation component 606 may be part of an application (not shown), or the like, such as any of an image processing application, a photo editing application, a presentation generating application, a word processing application, or any other suitable application. Further in other implementations, matting component 1916, user interface component 1922 and trimap segmentation component 606 are separate components not included in an application, and/or may be part of an operating system (not shown).

The computing system environment 1900 can also include one or more communication interfaces 1906 for exchanging data with other devices, such as via a network, direct connection, or the like, as discussed above. The communication interfaces 1906 can facilitate communications within a wide variety of networks and protocol types, including wired networks (e.g., LAN, cable, etc.) and wireless networks (e.g., WLAN, cellular, satellite, etc.), the Internet and the like.

The display device 1908, such as a monitor, display, or screen, may be included in some implementations for displaying the user interface 1924 and/or an input image to a user. In addition to mouse 1928, I/O devices 1910 may include devices that receive various inputs from a user and provide various outputs to the user, such as a keyboard, remote controller, a camera, audio devices, joystick and so forth.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or applications, and may be implemented in general purpose and special-purpose computing systems, or other devices having processing capability.

Additionally, the components, frameworks and processes herein can be employed in many different environments and situations. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the processes, components and modules described herein may be implemented by a computer program product.

Although illustrated in FIG. 19 as being stored in memory 1904 of computing system environment 1900, matting component 1916, trimap segmentation component 606, user interface component 1922, or portions thereof, may be implemented using any form of computer-readable media that is accessible by computing system environment 1900. Computer-readable media may include, for example, computer storage media and communications media. Computer storage media is configured to store data on a non-transitory tangible medium, while communications media is not.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Implementations herein provide fast and efficient interactive image matting. Further, some implementations enable interactive matting processing using relatively large or optimized kernel sizes. The user interface can provide the user with feedback including a resulting matte in real time, thereby enabling the user to further refine or modify the matte as desired and creating a more satisfying user experience than that provided by conventional techniques.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
receiving an indication of a brush stroke made on an image displayed in a user interface, wherein the user interface provides a plurality of brush types, including a first brush type for identifying a foreground region of the image and a second brush type for identifying an unknown region of the image;
identifying an area of the image as a foreground region based at least in part on a location of a brush stroke of the first brush type on the image;
generating a boundary area on a border of the foreground region, the boundary area containing an unknown region;
identifying the unknown region of the image based at least in part on a location of a brush stroke of the second brush type on the image;
solving, by a processor, the unknown region to provide an alpha matte that distinguishes a foreground portion from a background portion in the unknown region; and
displaying the alpha matte for the unknown region in real time in response to receiving the indication of a brush stroke of a one of the plurality of brush types.

2. The method according to claim 1, wherein the brush stroke is made with the first brush type to indicate selection of the foreground region, and further comprising:
receiving an indication of a second brush stroke made with the second brush type to indicate an expanded unknown region;
solving the expanded unknown region to provide a modified alpha matte; and
displaying the modified alpha matte for the expanded unknown region.

3. The method according to claim 1, wherein the boundary area is initially generated having a predetermined width specified through the user interface.

4. The method according to claim 1, further comprising an automated brush selection mechanism causing the first brush type to be automatically selected when a cursor of an input device is located over the foreground region and the second brush type to be automatically selected when the cursor is located over the unknown region.

5. The method according to claim 4, further comprising a third brush type for identifying a background region, the automated brush selection mechanism causing the third brush type to be automatically selected when the cursor is located over the background region.

6. The method of claim 1, wherein solving the unknown region provides the alpha matte for a portion of the image based at least in part on a location of a most recent brush stroke of a one of the plurality of brush types.

7. The method of claim 1, wherein solving the unknown region provides the alpha matte for a portion of the image based at least in part upon a radius of the brush of the most recent brush stroke of the one of the plurality of brush types.

8. The method of claim 1, wherein solving the unknown region is processed in a predetermined number of iterations.

9. The method of claim 1, further comprising placing the foreground region on a new background as a composite image.

10. A method comprising:
receiving a user input as a first brush stroke made using a first brush type, the first brush stroke identifying a portion of an image as a foreground region;
in response to the first brush stroke, identifying, by a processor, an unknown region adjacent to the foreground region;
displaying an alpha matte that distinguishes foreground elements from background elements in the unknown region;
receiving a second user input as a second brush stroke made using a second brush type, the second brush stroke identifying a portion of a background region to be included in the unknown region;
in response to the second brush stroke, providing a modified alpha matte including an updated portion of the unknown region;
displaying the modified alpha matte in real time.

11. The method according to claim 10, wherein
additional portions of the foreground region are automatically identified as part of the foreground region based at least in part on statistically determined color similarities with the identified portion of the foreground region; and
the unknown region is comprises a boundary of a specified width generated between the foreground region and the background region.

12. The method according to claim 10, further comprising automatically switching between the first brush type and the second brush type, wherein
when a cursor of an input device is located over the foreground region, the first brush type is automatically selected; and
when the cursor is located over the unknown region, the second brush type is automatically selected.

13. The method according to claim 10, further comprising solving the alpha matte by:
employing a plurality of rectangles covering the unknown region, the plurality of rectangles having a size based at least in part on a number of unknown pixels in a corresponding plurality of segments of the unknown region; and
solving for the alpha matte over the plurality of rectangles using an integral images technique.

14. The method according to claim 10, further comprising solving the alpha matte by sub-sampling the image into a coarse resolution used to solve the unknown area, and subsequently perform bilinear interpolation to generate the alpha matte at a finer resolution based at least in part on a resolution of the image.

15. The method according to claim 10, further comprising calculating foreground colors in parallel with calculating the alpha matte.

16. A system comprising:
 a processor in communication with computer-readable storage media;
 a user interface component, maintained in the computer-readable storage media and executed on the processor, to receive a first user input comprising a first brush stroke made with a first brush type indicating a foreground region of an image, the user interface component generating an unknown region of a fixed width adjacent to the foreground region indicated by the first brush stroke, and further to receive a second user input comprising a second brush stroke made with a second brush type for identifying portions of the image for inclusion in the unknown region; and
 a matting component to provide an alpha matte that distinguishes a foreground portion from a background portion in the unknown region.

17. The system according to claim 16, wherein the matting component further comprises a variable kernel size component to solve the unknown region of the image using a kernel size selected relative to a size of the unknown region.

18. The system according to claim 16, the matting component further comprising a localized integral images component to employ a plurality of local windows covering the unknown region to solve for the alpha matte using an integral images technique.

19. The system according to claim 16, the matting component further comprising a coarse-to-fine approximation component to sub-sample the image into a coarse resolution used to solve the unknown area, and subsequently perform bilinear interpolation to generate the alpha matte at a finer resolution based at least in part on a resolution of the image.

20. The system according to claim 16, the matting component further comprising a foreground estimation component to estimate foreground colors and the alpha matte in parallel.

* * * * *